(12) United States Patent
Pon et al.

(10) Patent No.: US 11,233,544 B1
(45) Date of Patent: Jan. 25, 2022

(54) METHODS AND APPARATUS FOR MULTIPATH IMPROVEMENTS USING MULTIPLE ANTENNAS

(71) Applicant: QUALCOMM Incorporated, San Diego, CA (US)

(72) Inventors: Rayman Wai Pon, Cupertino, CA (US); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/995,312

(22) Filed: Aug. 17, 2020

(51) Int. Cl.
*H04B 7/06* (2006.01)
*H04B 7/0408* (2017.01)
*H01Q 19/19* (2006.01)
*H04B 7/08* (2006.01)

(52) U.S. Cl.
CPC ......... *H04B 7/0408* (2013.01); *H01Q 19/191* (2013.01); *H04B 7/0697* (2013.01); *H04B 7/0897* (2013.01)

(58) Field of Classification Search
CPC ........ H04B 17/27; H04B 7/0413; H04B 7/02; H04B 7/04; H04B 7/0408; H04B 7/0697; H04B 7/0897; H01Q 19/191
See application file for complete search history.

(56) References Cited

U.S. PATENT DOCUMENTS 6,304,214 B1 10/2001 Aiken et al.
7,495,614 B2 2/2009 Small
7,652,625 B2 1/2010 Small
(Continued)

FOREIGN PATENT DOCUMENTS

WO 2019239365 A1 12/2019

OTHER PUBLICATIONS

Davis J.G., et al., "A Positioning Algorithm for Wireless Sensors in Rich Multipath Environments", IEEE Microwave and Wireless Components Letters, IEEE Service Center, New York, NY, US, vol. 18, No. 9, Sep. 12, 2008 (Sep. 12, 2018), pp. 644-646, XP011234490, ISSN: 1531-1309, DOI: 10.1109/LMWC.2008.2002497 figure 2 Section V.

(Continued)

*Primary Examiner* — Rahel Guarino
(74) *Attorney, Agent, or Firm* — QUALCOMM Incorporated

(57) ABSTRACT

A spatially diverse antenna array may be used to reduce or eliminate multipath errors in ranging measurements for a mobile device. The spatial diversity in the antenna structure enables different locations of the antenna to experience different signal characteristics from which multipath signals may be identified. The measured relative reception time for each antenna in the array may be determined. The expected relative reception time for each antenna in the antenna array is determined based on an estimated location and orientation of the antenna array. The expected and measured relative reception times are fit to align the expected and measured relative reception times for one antenna such that for all other antennas the measured relative reception time is aligned or greater than the expected relative reception times. The range between the mobile device and the transmitter may be based on the fit of the expected and measured relative reception times.

28 Claims, 9 Drawing Sheets

(56) References Cited

U.S. PATENT DOCUMENTS

| | | |
|---|---|---|
| 9,516,513 B2 | 12/2016 | Sægrov et al. |
| 10,267,922 B2 | 4/2019 | Surinder |
| 2014/0016485 A1* | 1/2014 | Curticapean .......... H04W 64/00 |
| | | 370/252 |

OTHER PUBLICATIONS

International Search Report and Written Opinion—PCT/US2021/042758—ISA/EPO—dated Oct. 28, 2021.
Kulaib A.R., et al., "Performance Evaluation of Linear and Circular Arrays in Wireless Sensor Network Localization", Electronics, Circuits and Systems (ICECS), 2011 18th IEEE International Conference on, IEEE, Dec. 11, 2011 (Dec. 11, 2011), pp. 579-582, XP032095110, DOI: 10.1109/ICECS.2011.6122341, ISBN: 978-1-4577-1845-8 figure 1 figure 2 Section I Section II.
Skiribou C., et al., "LOS Identification for High Accuracy TOA-Based Ranging System in Tunnel Environments", AEU—International Journal of Electronics And Communications, vol. 98, Oct. 26, 2018 (Oct. 26, 2018), pp. 38-44, XP055852088, Amsterdam, NL ISSN: 1434-8411, DOI: 10.1016/j.aeue.2018.10.028 figure 1 figure 2 Section 1, penultimate paragraph Section 3 Section 4.

* cited by examiner

METHODS AND APPARATUS FOR MULTIPATH IMPROVEMENTS USING MULTIPLE ANTENNAS

BACKGROUND

Location determination based on wireless signals is useful for many applications including position determination, navigation and asset tracking. There are several well-known techniques used for positioning with wireless signals. For example, ranging techniques may be used to determine the distance between one entity and another based on the time for a wireless signal to propagate between entities. In some implementations, the round trip time (RTT) for signals between entities may be measured. Other implementations may use a single sided transmission to determine the range. Using multiple transmitters having known locations, a range to each transmitter may be measured and used, along with the locations of the transmitters, to determine a position of the device, e.g., using trilateration.

The accuracy of ranging measurements, and thus, the resulting positioning measurement, is related to whether the signals between the device and transmitter are line of sight (LOS), non-LOS, or includes multipath. LOS signals are received directly from the transmitter in a straight line path, while multipath signals are reflected, refracted or otherwise deflected by one or more intervening objects and arrive at the device via two or more straight line paths. Measurements of multipath signals can significantly impair location accuracy. In particular, multipath in an indoor environment, such as a factory floor, is very severe, with signals being reflected from most objects including walls, ceilings, floors, furniture, and people.

Diversity methods have been developed to mitigate the effects of multipath in communication-based systems. These methods for communication-based systems, however, typically do not discriminate between direct and reflected signals, as a strong signal is more important than a direct signal for communications. Positioning systems, however, rely on LOS signals for accuracy of the positioning measurement. Accordingly, diversity methods used for conventional communication-based systems are not suitable for mitigation of multipath in positioning systems. Solutions to eliminate or mitigate multipath effects, e.g., in positioning systems are therefore desirable.

SUMMARY

A spatially diverse antenna array may be used to reduce or eliminate multipath errors in ranging measurements for a mobile device. The spatial diversity in the antenna structure enables different locations of the antenna to experience different signal characteristics from which multipath signals may be identified. The measured relative reception time for each antenna in the antenna array may be determined. The expected relative reception time for each antenna in the antenna array is determined based on an estimated location and orientation of the antenna array. The expected and measured relative reception times are fit to align the expected and measured relative reception times for one antenna such that for all other antennas the measured relative reception time is aligned or greater than the expected relative reception times. The range between the mobile device and the transmitter may be based on the fit of the expected and measured relative reception times.

In one implementation, a method of determining a range between a wireless transmitting device and a receiving device, including determining a measured relative reception time at the receiving device of one or more signals transmitted by the wireless transmitting device for each antenna in an antenna array that is spatially diverse, wherein each antenna is at a different location in the antenna array; determining an expected relative reception time of line of sight signals transmitted by the wireless transmitting device for each antenna in the antenna array; fitting the expected relative reception times to the measured relative reception times by aligning the expected relative reception time and the measured relative reception times for a first antenna with all other antennas in the antenna array having a measured relative reception time that is aligned with or greater than the expected relative reception time; and determining an estimated best distance between the receiving device and the wireless transmitting device for a reference point relative to the antenna array based on the expected relative reception times fit to the measured relative reception times.

In one implementation, a receiving device configured to determine a range between a wireless transmitting device and the receiving device, including a wireless receiver configured to wirelessly receive signals from the wireless transmitting device; at least one memory; and at least one processor coupled to the wireless receiver and the at least one memory and configured to: determine a measured relative reception time at the receiving device of one or more signals transmitted by the wireless transmitting device for each antenna in an antenna array that is spatially diverse, wherein each antenna is at a different location in the antenna array; determine an expected relative reception time of line of sight signals transmitted by the wireless transmitting device for each antenna in the antenna array; fit the expected relative reception times to the measured relative reception times by aligning the expected relative reception time and the measured relative reception times for a first antenna with all other antennas in the antenna array having a measured relative reception time that is aligned with or greater than the expected relative reception time; and determine an estimated best distance between the receiving device and the wireless transmitting device for a reference point relative to the antenna array based on the expected relative reception times fit to the measured relative reception times.

In one implementation, a receiving device configured to determine a range between a wireless transmitting device and the receiving device, including means for determining a measured relative reception time at the receiving device of one or more signals transmitted by the wireless transmitting device for each antenna in an antenna array that is spatially diverse, wherein each antenna is at a different location in the antenna array; means for determining an expected relative reception time of line of sight signals transmitted by the wireless transmitting device for each antenna in the antenna array; means for fitting the expected relative reception times to the measured relative reception times by aligning the expected relative reception time and the measured relative reception times for a first antenna with all other antennas in the antenna array having a measured relative reception time that is aligned with or greater than the expected relative reception time; and means for determining an estimated best distance between the receiving device and the wireless transmitting device for a reference point relative to the antenna array based on the expected relative reception times fit to the measured relative reception times.

In one implementation, a non-transitory computer readable storage medium including program code stored thereon, the program code is operable to configure at least one processor in a receiving device to determine a range between a wireless transmitting device and the receiving device, including program code to determine a measured relative reception time at the receiving device of one or more signals transmitted by the wireless transmitting device for each antenna in an antenna array that is spatially diverse, wherein each antenna is at a different location in the antenna array; program code to determine an expected relative reception time of line of sight signals transmitted by the wireless transmitting device for each antenna in the antenna array; program code to fit the expected relative reception times to the measured relative reception times by aligning the expected relative reception time and the measured relative reception times for a first antenna with all other antennas in the antenna array having a measured relative reception time that is aligned with or greater than the expected relative reception time; and program code to determine an estimated best distance between the receiving device and the wireless transmitting device for a reference point relative to the antenna array based on the expected relative reception times fit to the measured relative reception times.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1A:
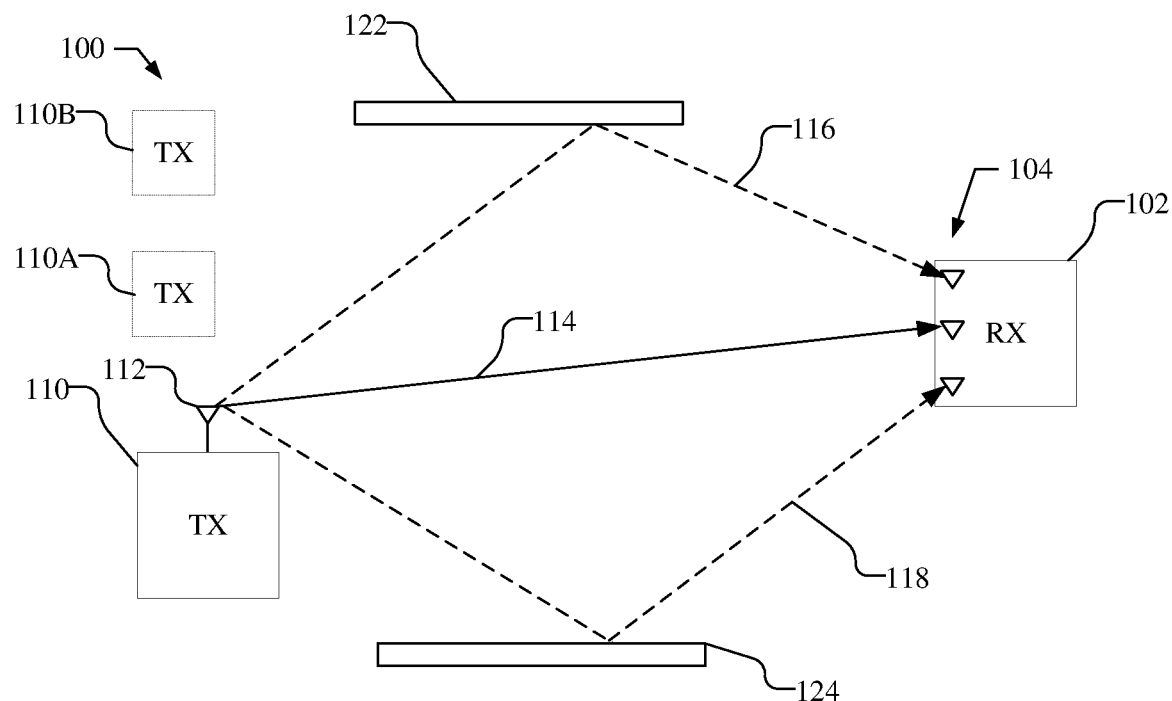
FIGS. 1A and 1B illustrate a simplified environment illustrating ranging between a mobile device and transmitter using a spatially diverse antenna array.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the terms "aspects of the disclosure" or "one implementation" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A mobile device, also referred to herein as a UE, may be mobile or may (e.g., at certain times) be stationary, and may communicate with a radio access network (RAN) but is not intended to be specific or otherwise limited to any particular otherwise limited to any particular Radio Access Technology (RAT), unless otherwise noted. As used herein, the term "mobile device" or "UE" may be referred to interchangeably as an "access terminal" or "AT," a "client device," a "wireless device," a "subscriber device," a "subscriber terminal,"

a "subscriber station," a "user terminal" or UT, a "mobile terminal," a "mobile station," or variations thereof. In general, a mobile device may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. Generally, mobile devices can communicate with a core network via a RAN, and through the core network the mobile devices may be connected with external networks such as the Internet and with other mobile devices. Of course, other mechanisms of connecting to the core network and/or the Internet are possible and may be used for the mobile device, such as over wired access networks, WiFi networks (e.g., based on IEEE 802.11, etc.) and so on. Mobile devices can be embodied by any of a number of types of devices including but not limited to printed circuit (PC) cards, compact flash devices, external or internal modems, wireless or wireline phones, smartphones, tablets, tracking devices, asset tags, and so on.

Obtaining the location of a mobile device that is accessing a wireless (e.g., cellular or WiFi) network may be useful for many applications including, for example, emergency calls, personal navigation, asset tracking, locating a friend or family member, etc. One type of positioning method that may be used to estimate the location of a mobile device is a ranging measurement that determines the time of flight or propagation time for one or more signals between the mobile device and another endpoint (transmitter and/or receiver) in a wireless network. The time of flight of a radio frequency (RF) signal corresponds to the range (distance) between the two endpoints, e.g., the range is the time of flight divided by the speed of light.

By way of example, one time ranging measurement is round-trip-time (RTT), that measures the propagation time for an RF signal between one entity and another, e.g., from an access point or base station to a mobile device or vice versa, plus the propagation time for a return signal, e.g., an acknowledgement of that signal, to be received. The time delay includes the propagation times for the paths between the two endpoints, which is proportional to the distance between the two communication endpoints. The time delay further includes processing delays within an endpoint, e.g., to receive, process, and respond to a signal. The processing delays may be calibrated out of the RTT measurement in order to obtain an accurate position measurement.

Another example of a ranging measurement is single sided. For example, a signal may be sent from a transmitter to a receiver, along with the time of departure (TOD) of the transmitted signals. The receiver may measure the time of arrival (TOA) of the signal, which may be used with the received TOD to determine the propagation time for the signal between the two communication endpoints, which corresponds to the distance between the two endpoints.

A common source of error or uncertainty in ranging measurements is due to multipath signals, e.g., signals that are reflected, refracted or otherwise deflected by one or more intervening objects and arrive at the device via two or more straight line paths. The use of line of sight (LOS) signals, e.g., radio frequency signals that are received directly from a transmitter in a straight line path, are preferred for ranging measurements.

In one implementation, as described herein, multiple antennas with a pre-defined geometric structure may be used with a mobile device to provide a spatially diverse antenna structure to improve range measurements. The spatial diversity in the antenna structure of the mobile device enables different locations of the antenna to experience different signal characteristics, with which multipath error may be identified. For example, for multipath dominant error, the spatially diverse antenna may be used to identify the earliest arrival path measurements from the multiple antennas. The earliest arrival path measurement from the multiple antennas may be used for ranging, thereby minimizing or eliminating the multipath ranging error. Additionally, in one implementation, with multiple independent measurements a best ensemble fit may be used for zero mean distribution errors.

These techniques and other aspects are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

FIG. 1A illustrates a simplified environment depicting two endpoint components of a wireless network 100 in which LOS and multipath signals may be differentiated using a spatially diverse antenna array. As illustrated in FIG. 1A, one endpoint of the wireless network 100 is a mobile device 102 may include the spatially diverse antenna array 104 and is illustrated as a receiver (Rx). The other endpoint of the wireless network 100 is illustrated as a transmitter (Tx) 110, which has a known fixed location. The transmitter 110 may have a single antenna 112, although an antenna array on the transmitter 110 may be used if desired.

FIG. 1A illustrates the wireless network 100 being used to determine the range between the mobile device 102 and the transmitter 110, e.g., using a single sided ranging process, e.g., by determining the time of flight for a signal from the transmitter to the mobile device 102. If desired, however, other ranging procedures may be used, such as RTT, in which case, the mobile device 102 and the transmitter 110 both include both receivers and transmitters. For the sake of convenience, the use of the spatially diverse antenna array 102 will be described herein in the context of a single sided ranging procedure, unless specified otherwise.

As illustrated in FIG. 1A, the transmitter 110 may transmit a signal along a LOS path 114 that is received by the mobile device 102 and may be used for a ranging procedure. The environment, however, may include multiple objects, illustrated as walls 122 and 124, which may reflect or otherwise deflected the signal along multipaths 116 and 118. As can be seen, the path travelled by the signal is greater for the multipaths 116 and 118 than for the LOS path 114, and thus, it is desirable for an accurate ranging measurement to identify the signal received along the LOS path 114. It should be understood that, in some circumstances, there may be no LOS path, nevertheless, in such circumstances it would still be desirable to identify the signal along the shortest multipath in order to reduce errors presented by the multipath signals. As illustrated, additional transmitters 110A and 110B may be present. The mobile device 102 may determine an accurate range to each of the transmitters 110, 110A, and 110B, with knowledge of the locations of the transmitters 110, 110A, and 110B, may determine the location of the mobile device 102 using, e.g., trilateration.

The spatially diverse antenna array 104 and associated methods, as described herein, enable different locations of the antenna array to experience different signal characteristics with which the LOS signal (or at least the signal along the shortest multipath) may be identified.

Figure 1B:
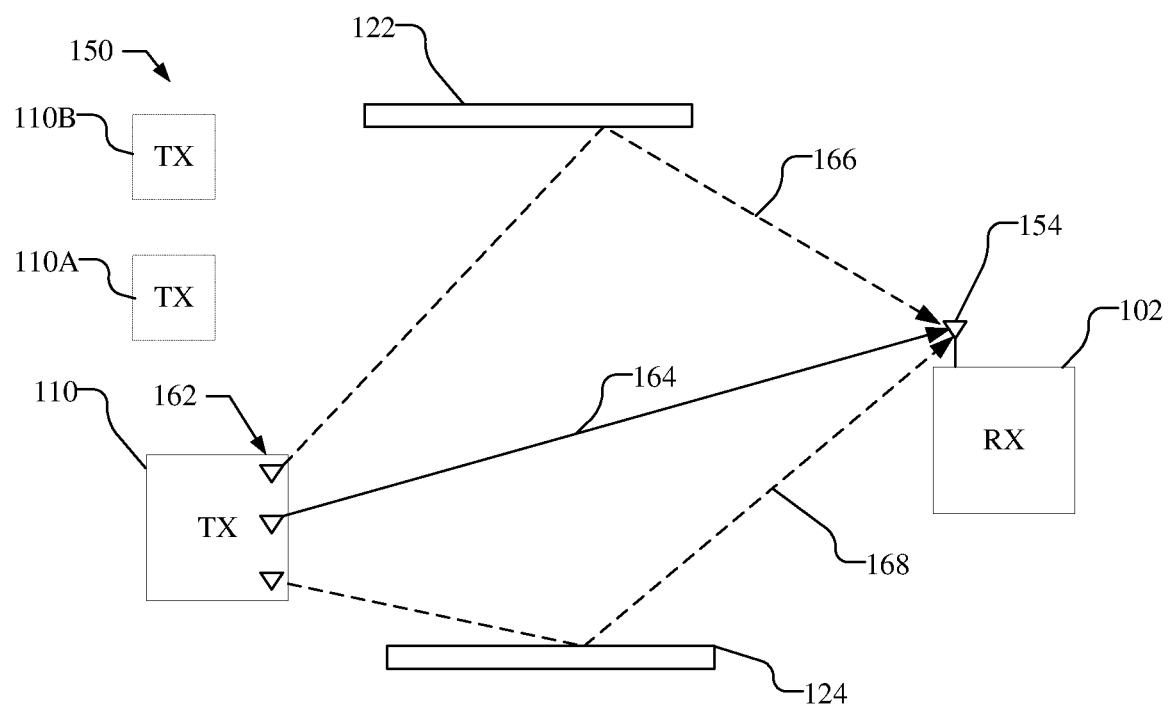

FIG. 1B illustrates another simplified environment depicting two endpoint components of a wireless network 150 in which LOS and multipath signals may be differentiated using a spatially diverse antenna array. FIG. 1B is similar to FIG. 1A, but in FIG. 1B, the transmitter 110 is illustrated as including the spatially diverse antenna array 162 and the mobile device 102 may have a single antenna 154, although an antenna array on the mobile device 102, e.g., as illustrated in FIG. 1A, may be used if desired.

As illustrated in FIG. 1B, the transmitter 110 may transmit signals from the antenna array 162 along a LOS path 164 and along multipaths 166 and 168, e.g., reflected from objects 122 and 124. For example, each antenna element in the antenna array 162 may transmit a unique positioning signal on the same carrier frequency. The spatially diverse antenna array 162 and associated methods, as described herein, enable different locations of the antenna array to experience different signal characteristics with which the LOS signal (or at least the signal along the shortest multipath) may be identified.

As illustrated, additional transmitters 110A and 110B may be present. The mobile device 102 may determine an accurate range to each of the transmitters 110, 110A, and 110B, with knowledge of the locations of the transmitters 110, 110A, and 110B, may determine the location of the mobile device 102 using, e.g., trilateration.

The spatially diverse antenna structure and methods discussed herein may be particularly suitable for Industrial IOT (IIOT), although it is not limited thereto. For example, the additional costs associated with additional Wireless Wide Area Network (WWAN) antennas may not be prohibitive considering the total system cost. The spatially diverse antenna array structure may be fitted to mobile devices or robots on factory floor for automation. For example, on a factor floor, the antenna structure has a constrained pose, i.e. it may be largely maintained on a horizontal plane, which may simplify processing. Additionally, the orientation sensors, such as a compass, magnetometer, gyroscope, etc., may be easily included for azimuth determination. In a factory setting, the height of the antenna structure may be generally known as it may be mounted in a fixed position on a robot. While such factors are simplified, particularly in a IIOT device, e.g., on a factory floor, these factors are not a requirement and other types of devices may advantageously use the spatially diverse antenna structure and methods discussed herein. For example, the spatially diverse antenna structure and methods may be used for smartphone or other consumer devices, although there may be increased cost from multiple antennas, limits on the size of antenna structure available for spatial diversity, and unconstrained device pose and height.

Figure 2:
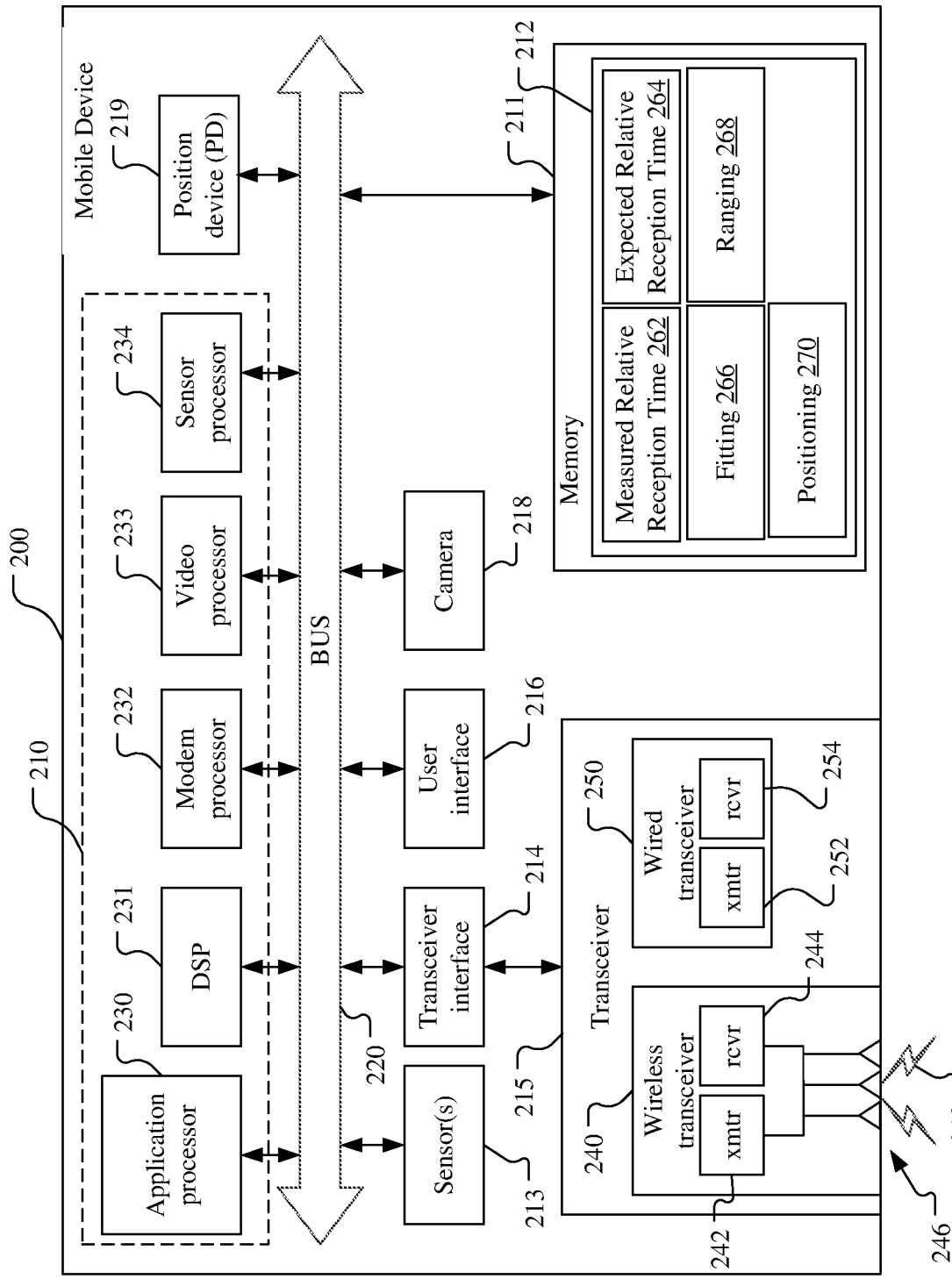
FIG. 2 illustrates a hardware implementation of the mobile device that may be configured for a ranging procedure using spatially diverse antenna array.

FIG. 2 illustrates a mobile device 200, which is an example of the mobile device 102 and comprises a computing platform including a processor 210, memory 211 including software (SW) 212, one or more sensors 213, a transceiver interface 214 for a transceiver 215, a user interface 216, a camera 218, and a position device (PD) 219. The processor 210, the memory 211, the sensor(s) 213, the transceiver interface 214, the user interface 216, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the mobile device 200, additionally one or more additional apparatus may be included, such as a Satellite Positioning System (SPS) receiver. The processor 210 may include one or more intelligent hardware devices, e.g., a central processing unit (CPU), a microcontroller, an application specific integrated circuit (ASIC), etc. The processor 210 may comprise multiple processors including an application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the mobile device 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to operate as a special purpose computer programmed to perform the various functions described herein. Alternatively, the software 212 may not be directly executable by the processor 210 but may be configured to cause the processor 210, e.g., when compiled and executed, to operate as a special purpose computer to perform the various functions described herein. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the mobile device 200 performing a function as shorthand for one or more appropriate components of the mobile device 200 performing the function. The processor 210 may include a memory with stored instructions in addition to and/or instead of the memory 211. Functionality of the processor 210 is discussed more fully below.

The configuration of the mobile device 200 shown in FIG. 2 is an example and not limiting of the invention, including the claims, and other configurations may be used. For example, an example configuration of the mobile device includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the camera 218, the PD 219, and/or the wired transceiver 250.

The mobile device 200 may comprise the modem processor 232 that may be capable of performing baseband processing of signals received and down-converted by the transceiver 215. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The mobile device 200 may include the sensor(s) 213 that may include, for example, one or more of various types of sensors such as one or more inertial sensors, one or more barometric pressure sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the mobile device 200 in three dimensions), one or more gyroscopes, one or more magnetometers, a digital compass, or a combination thereof. The one or more magnetometers and/or digital compass may be used to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the mobile device 200 is fixed (stationary) or mobile. For example, based on the information obtained/measured by the sensor(s), the mobile device 200 may determine that the mobile device 200 has detected movements or that the mobile device 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the mobile device 200, etc.

The IMU may be configured to provide measurements about a direction of motion and/or a speed of motion of the mobile device 200, which may be used in relative location determination. For example, one or more accelerometers and/or one or more gyroscopes of the IMU may detect, respectively, a linear acceleration and a speed of rotation of the mobile device 200. The linear acceleration and speed of rotation measurements of the mobile device 200 may be integrated over time to determine an instantaneous direction of motion as well as a displacement of the mobile device 200. The instantaneous direction of motion and the displacement may be integrated to track a location of the mobile device 200. For example, a reference location of the mobile device 200 may be determined, e.g., using ranging and trilateration (and/or by some other means) for a moment in time and measurements from the accelerometer(s) and gyroscope(s) taken after this moment in time may be used in dead reckoning to determine present location of the mobile device 200 based on movement (direction and distance) of the mobile device 200 relative to the reference location. The absolute orientation of the mobile device 200 may be similarly determined using a reference orientation and gyroscope measurements, e.g., based on rotation of the mobile device 200 relative to the reference orientation.

The magnetometer(s) may determine magnetic field strengths in different directions which may be used to determine orientation of the mobile device 200. For example, the orientation may be used as a digital compass for the mobile device 200 to provide an absolute orientation of the mobile device 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 210.

The barometric pressure sensors(s) may determine air pressure, which may be used to determine the elevation or current floor level in a building of the mobile device 200. For example, a differential pressure reading may be used to detect when the mobile device 200 has changed floor levels as well as the number of floors that have changed. The barometric pressure sensors(s) may provide means for sensing air pressure and providing indications of the air pressure, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to a spatially diverse antenna array 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with Transmission Reception Points (TRPs) and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with an asset, robot, IIOT device, etc., that the mobile device 200 may be connected to. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the mobile device 200. For example, the user interface 216 may store indications of analog and/or digital signals in the memory 211 to be processed by DSP 231 and/or the processor 230 in response to action from a user. Similarly, applications hosted on the mobile device 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The mobile device 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216 and/or assist in determination of orientation, e.g., based on image recognition of markers having known positions.

The position device (PD) 219 may be configured to determine a position of the mobile device 200, motion of the mobile device 200, and/or relative position of the mobile device 200, and/or time. For example, the PD 219 may communicate with, and/or include some or all of, the sensors 213, transceivers 215, camera 218. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may be configured to determine location of the mobile device 200 using terrestrial-based signals from transmitter 110 shown in FIG. 1 (e.g., at least some of the signals 248) for ranging and trilateration. The PD 219 may be configured to use one or more other techniques (e.g., relying on the mobile device's self-reported location (e.g., part of the mobile device's position beacon)) for determining the location of the mobile device 200, and may use a combination of techniques (e.g., dead reckoning and terrestrial positioning signals) to determine the location of the mobile device 200. The PD 219 may include one or more of the sensors 213 (e.g., gyroscope(s), accelerometer(s), magnetometer(s), etc.) that may sense orientation and/or motion of the mobile device 200 and provide indications thereof that the processor 210 (e.g., the processor 230 and/or the DSP 231) may be configured to use to determine motion (e.g., a velocity vector and/or an acceleration vector) of the mobile device 200. The PD 219 may be configured to provide indications of uncertainty and/or error in the determined position and/or motion.

The memory 211 may store software 212 that contains executable program code or software instructions that when executed by the processor 210 may cause the processor 210 to operate as a special purpose computer programmed to perform the functions disclosed herein. As illustrated, the memory 211 may include one or more components or modules that may be implemented by the processor 210 to perform the disclosed functions. While the components or modules are illustrated as software 212 in memory 211 that is executable by the processor 210, it should be understood that the components or modules may be stored in another computer readable medium or may be dedicated hardware either in the processor 210 or off the processor. A number of software modules and data tables may reside in the memory 211 and be utilized by the processor 210 in order to manage both communications and the functionality described herein. It should be appreciated that the organization of the contents of the memory 211 as shown is merely exemplary, and as such the functionality of the modules and/or data structures may be combined, separated, and/or be structured in different ways depending upon the implementation.

The memory 211, for example, may include a measured relative reception time module 262 that when implemented by the processors 210 configures the processors 210 to measure the time of arrival of signals associated with the antennas in the antenna array and to generate a measured relative reception time for each antenna.

The memory 211, for example, may include an expected relative reception time module 264 that when implemented by the processors 210 configures the processors 210 to generate an expected relative reception time for each antenna in the antenna array based on an estimated range relative to each antenna.

The memory 211, for example, may include a fitting module 266 that when implemented by the processors 210 configures the processors 210 to fit the expected relative reception times to the measured relative reception times for the antennas in the antenna array, such that expected and measured relative reception times for one antenna is aligned and for all other antennas in the antenna array, the measured relative reception time is aligned with or greater than the expected relative reception time. The processors 210 may be further configured to detect non-line of sight reception of signals based on the fit of the expected relative reception times and the measured relative reception times or a comparison of the amplitudes and/or slopes.

The memory 211, for example, may include a ranging module 268 that when implemented by the processors 210 configures the processors 210 to determine a range between the mobile device and transmitting device based on the fit of the expected relative reception times and the measured relative reception times. For example, the processors 210 may be configured to use the time of arrival of the signal associated with the aligned antenna and use the time of departure of the signal as received from the transmitting device to determine the range. The processors 210 may be configured to further use the physical relation between the aligned antenna and a reference point relative to the antenna array to determine the range.

The memory 211, for example, may include a positioning module 270 that when implemented by the processors 210 configures the processors 210 to determine a position of the mobile device based on the determined ranges for a number of transmitters and the known positions of the transmitters, e.g. using trilateration.

Figure 3:
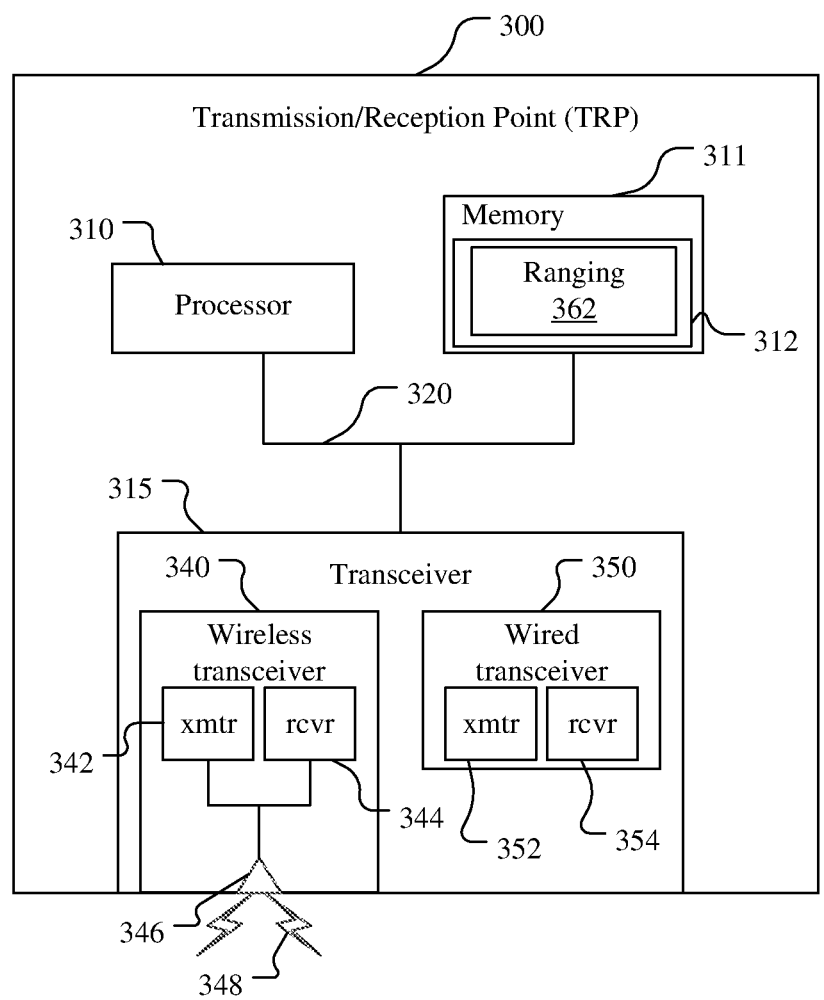
FIG. 3 shows an example of a Transmission Reception Point (TRP) that may be used as a transmitter for ranging with a mobile device using spatially diverse antenna array.

FIG. 3 shows an example of a Transmission Reception Point (TRP) 300, which may be, e.g., the transmitter 110 shown in FIGS. 1A and 1B. The TRP 300 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including one or more of an application processor, a DSP, a modem processor, a video processor, and/or a sensor processor, similar to that shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to operate as a special purpose computer programmed to perform the various functions described herein. Alternatively, the software 312 may not be directly executable by the processor 310 but may be configured to cause the processor 310, e.g., when compiled and executed, to operate as a special purpose computer to perform the various functions described herein. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the transmitters 110, 110a, 110b) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346, which may be a spatially diverse antenna array, for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the mobile device 200, one or more other mobile devices, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with a network to send communications to, and receive communications from, other TRPs or a core network, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by a location server in a core network and/or the mobile device 200 (i.e., the location server in a core network and/or the mobile device 200 may be configured to perform one or more of these functions).

The memory 311 may store software 312 that contains executable program code or software instructions that when executed by the processor 310 may cause the processor 310 to operate as a special purpose computer programmed to perform the functions disclosed herein. As illustrated, the memory 311 may include one or more components or modules that may be implemented by the processor 310 to perform the disclosed functions. While the components or modules are illustrated as software 312 in memory 311 that is executable by the processor 310, it should be understood that the components or modules may be stored in another computer readable medium or may be dedicated hardware either in the processor 310 or off the processor. A number of software modules and data tables may reside in the memory 311 and be utilized by the processor 310 in order to manage both communications and the functionality described herein. It should be appreciated that the organization of the contents of the memory 311 as shown is merely exemplary, and as such the functionality of the modules and/or data structures may be combined, separated, and/or be structured in different ways depending upon the implementation.

The memory 311, for example, may include a ranging module 362 that when implemented by the processor 310 configures the processor 310 to perform a ranging procedure with the mobile device 102, including sending one or more signals to the mobile device 102 for ranging. The processor 310 may be configured to transmit a one signal via an antenna or transmit signals from each antenna in an antenna array, where each signal is has a different signal characteristic, such as a unique positioning signal on the same carrier frequency. The processor 310 may be further configured to transmit a time of departure of the transmitted signal(s).

In one implementation, a spatially diverse antenna array, having a pre-defined geometric structure, may be used to produce range measurements between a mobile device and another entity with minimized multipath error. The antenna elements in the antenna array, for example, are at different locations and experience different signal characteristics, which may be used to identify the earliest arrival path for a signal. The earliest arrival may be used to for the ranging measurement.

Figure 4A:
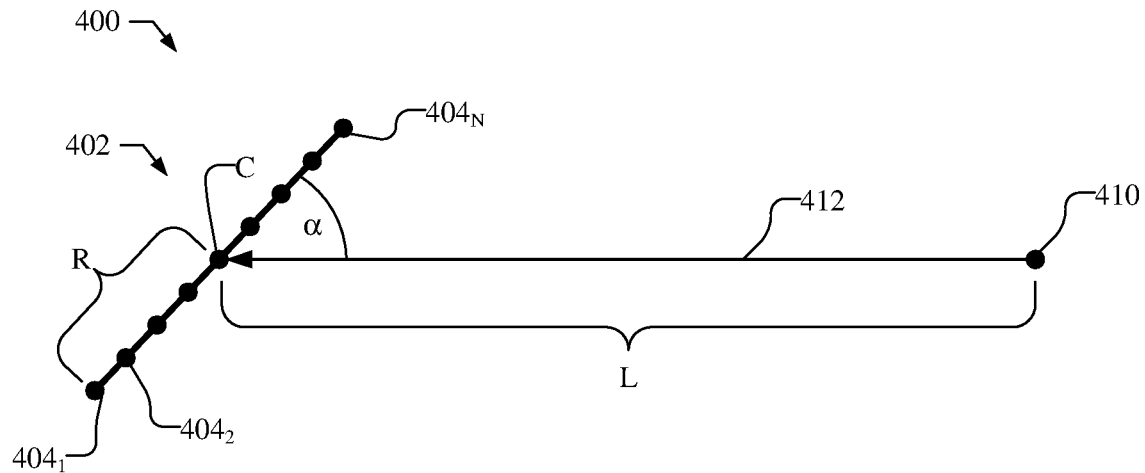
FIGS. 4A and 4B respectively shows an antenna array receiving a line of sight signal transmitted by a transmitter antenna and a curve that visually illustrates relative reception time of signal at each antenna in the antenna array.

FIG. 4A illustrates, by way of example, signal reception 400 by an antenna array 402 of a LOS signal 412 transmitted by a transmitter antenna 410. The antenna array 402 includes a number of individual antennas $404_1$, $404_2$, . . . $404_N$, sometimes collectively referred to as antennas 404, that have a known geometric relationship. The antenna array 402 may be part of the mobile device 102 and the transmitter antenna may be part of the transmitter 110 shown in FIG. 1A. For example, each antenna 404 may be a known distance from an adjacent antenna along a straight line. For example, as illustrated antennas $404_1$ and $404_N$ may be a distance R from the center C of the antenna array 402, and the remaining antennas may be symmetrically arranged along the linear antenna array 402. Other geometric relationships and arrangements of antennas may be used if desired. As illustrated, a reference point having a known relation to the antenna array, illustrated as the center C of the linear antenna array 402 in FIG. 4A, has a distance L to the transmitter antenna 410. Additionally, the linear antenna array 402 may be oriented at an angle α with respect to the transmitter antenna 410 and the transmitter antenna 410 may have an elevation angle β with respect to the antenna array 402.

During a ranging measurement, the distance L to the reference point with respect to the antenna array 402 is measured based on the difference between the time of departure (TOD) and the time of arrival (TOA) of the signal 412. For example, the TOD may be included in the signal 412 or may sent in a separate signal. Of course, each antenna 404 in the antenna array 402 receives the signal 412, but due to the geometry and orientation of the antenna array 402, each antenna 404 will receive the signal at a slightly different time. For example, it will take longer for the signal 412 to travel between the transmitter array 410 and $404_1$ than between the transmitter array 410 and antenna $404_2$.

Figure 4B:
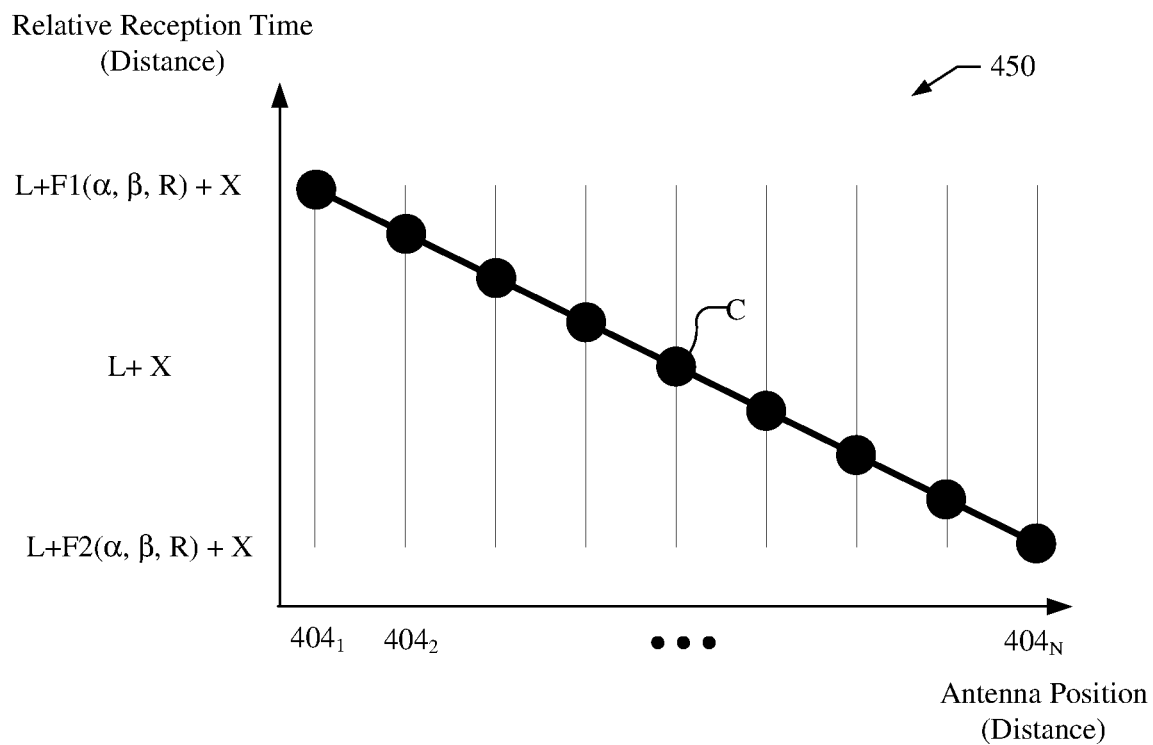

FIG. 4B shows a curve 450 that, by way of example, visually illustrates the position of each antenna 404 on the antenna array 402 with respect to the relative reception time (distance) of signal 412 at each antenna 404. The relative reception time at each antenna 404 corresponds to a distance as time may be divided by the speed of light constant (speed of the radio frequency signal) to produce the distance. The relative reception time (distance) at each antenna 404 is a function of the approximate orientation of the antenna array 402 with respect to the transmitter antenna 410, the relative locations of the antennas 404 in the antenna array 402, and the distance to the transmitter antenna 410, e.g., a function of α, β, R, and L. For example, as illustrated in FIG. 4B, the relative reception time (distance) for the center C of the antenna array 402 is L+X, where L is the distance shown in FIG. 4A, and X is an unknown offset as the mobile device 102 may not have an accurate stable clock synchronized to the transmitter 110. The relative reception time (distance) for other antennas in the antenna array 402 is additionally a function of α, β, and L and their distance from the center C of the antenna array 402. For example, the relative reception time (distance) for antennas $404_1$ and $404_N$ L+F1(α, β, R)+X and L+F2(α, β, R)+X, respectively, e.g., where F1(α, β, R) and F2(α, β, R) are geometric functions. For example, based on the orientation of the antenna array 402 relative to the direction to the transmitter antenna 410, the elevation angle β of the antenna array 402 to the transmitter antenna 410 and the radius R from the center of the antenna array 402, basic geometry and trigonometric functions may be used to express the functions F1 and F2 explicitly. It is noted that where the radius R is small compared to the distance L, then F1 and F2 will be nearly identical (but opposite in magnitude), but where the radius R is relatively large compared to the distance L, the geometry may not be symmetric.

FIGS. 4A and 4B illustrate reception of a LOS signal 412 and the relative reception times for a LOS signal. In practice, however, particularly in an indoor location, the antennas 404 in the antenna array 402 will also receive multipath signals, which make it much more difficult to accurately determine the range to the transmitting antenna.

In a similar arrangement, a spatially diverse antenna array may be located on the transmitter 110 (shown in FIG. 1B), where each antenna transmits a signal with a different signal characteristic, a unique positioning signal on the same carrier frequency, that is received by the receiver antenna. Assuming a linear antenna array, such as illustrated in FIG. 4A, that is used to transmit multiple LOS signals, the relative reception time at the receiver antenna for the LOS signals transmitted by the antennas in the antenna array on the transmitter will be similar to that shown in FIG. 4B. Again, in practice, however, particularly in an indoor location, some of the antennas in the transmitting antenna array will transmit along multipath signals, which make it much more difficult to accurately determine the range.

For ranging measurements, it is desirable to eliminate or at least minimize the effects of multipath signals.

Figure 5:
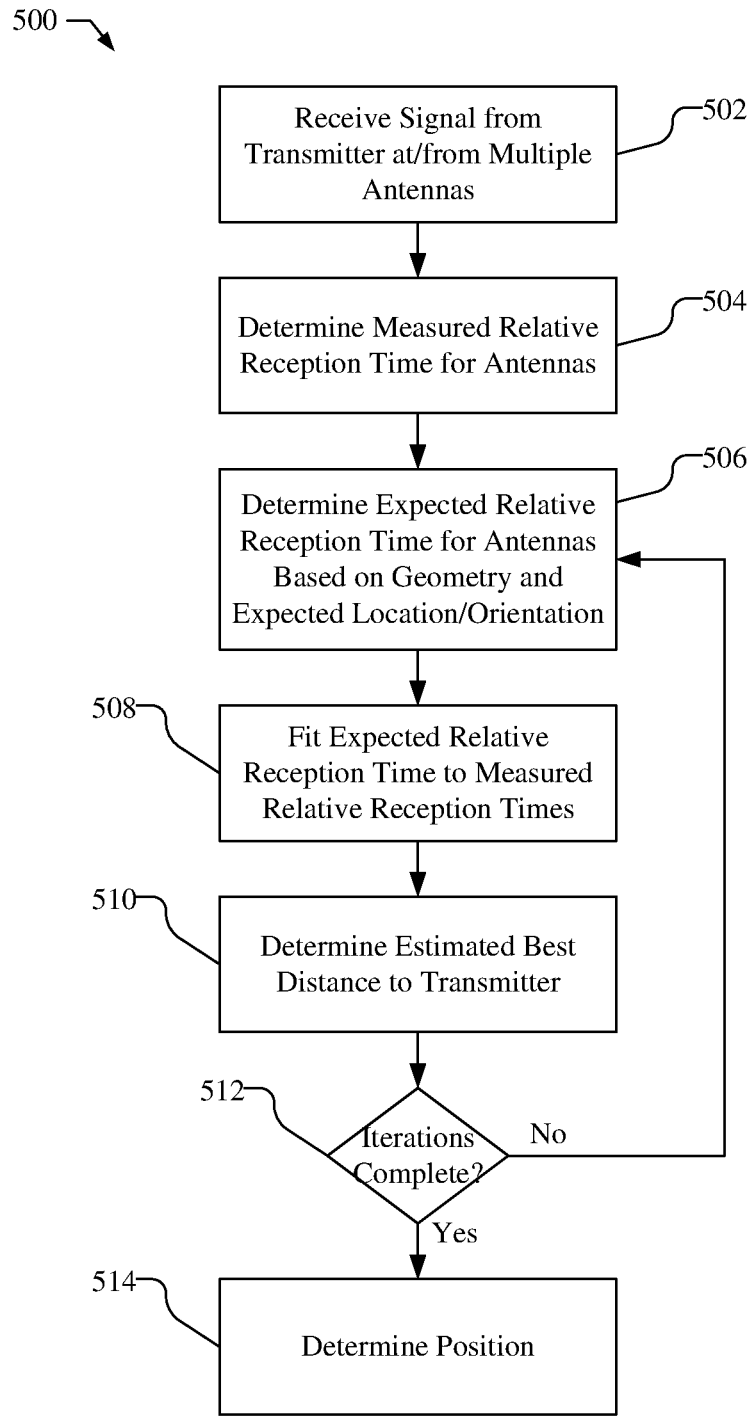
FIG. 5 shows a flow chart illustrating a procedure for using a spatially diverse antenna array on a receiver or transmitter to reduce or eliminate the effects of multipath signals in positioning measurements.

FIG. 5, by way of example, shows a flow chart 500 illustrating a procedure for using a spatially diverse antenna array on a receiver or transmitter to reduce or eliminate the effects of multipath signals in positioning measurements.

As illustrated at block 502, signals are received from a transmitter. For example, the signals may be received at multiple antennas in a spatially diverse antenna array, e.g., as illustrated in FIG. 4, or the signals may be transmitted with different signal characteristic from multiple antennas in a spatially diverse antenna array, as described above.

At block 504, the relative reception time of the signals is measured at the receiver for each antenna in the antenna array. For example, the TOA of each signal received at a different antenna in the antenna array or transmitted from a different antenna in the antenna array is measured. The TOAs of the signals may be compared to the TOA for a reference antenna to produce the measured relative reception time of the signals for the antennas in the antenna arrays.

At block 506, the expected relative reception time for each antenna in the antenna array may be determined. The expected relative reception time, for example, may be based on the known geometry and locations of the antennas in the antenna array, as well as the expected location and orientation of the mobile device with respect to the transmitter. The expected relative reception time for each antenna is based on the expected range between the receiving antenna(s) and the transmitting antenna(s), in other words, assuming the expected relative reception time for a LOS signal. The expected range, i.e., distance, in some implementations may be based on previously determined locations for the mobile device, which in some examples, may be updated using dead reckoning using the IMU sensors 213. The expected range, in other implementations, may be determined using multiple iterations of the present procedure. For example, a first iteration may be performed using a seed distance, e.g., determined from a previously determined location or from a preset value (e.g., which may be based on environmental parameters, such as the size of the factory floor). The present procedure may be used to determine the range or location of the mobile device based on the seed distance, and one or more additional iterations of the procedure performed using the previously determined range or location to refine the results. The orientation of the spatially diverse antenna array with respect to the transmitting antenna (if the antenna array is receiving signals) or with respect to the receiving antenna (if the antenna array is transmitting signals) may be determined based on the location of the mobile device, as well as based on IMU sensors 213, such as a magnetometer, or gyroscope, or the camera 218, or using dead reckoning measurements from a previous location. In the implementation where the antenna array is on the transmitter and receiver uses a single antenna, the transmitter has a fixed position and orientation, and thus, orientation of the mobile device 102 may not be necessary to determine.

At block 508, the expected relative reception times may be fit to the measured relative reception times. For example, the expected relative reception times may be aligned with measured relative reception times at a single antenna in the antenna array, where all other antennas in the antenna array have a measured relative reception time that is either aligned with or is greater than the expected relative reception time. In other words, the measured relative reception time of the signal received by (or transmitted by) the aligned antenna matches the expected relative reception time, while all other antennas in the antenna array have measured relative reception times that are the same as or longer than the expected relative reception time. Accordingly, the signal received by the aligned antenna is either a LOS signal or is the shortest multipath signal. In some implementations, the fit between the expected relative reception time and the measured relative reception time may be used to detect non-line of sight (NLOS) reception or gross multipath. For example, a comparison of the slope and/or amplitudes of the expected relative reception time and the measured relative reception time may be used to determine if NLOS is likely, e.g., if the differences are greater than thresholds.

At block 510, an estimated best distance to the transmitter may be determined. For example, the measured TOA for the signal received by (or transmitted by) the aligned antenna may be used (along with the TOD for that signal as received from the transmitter) to determine the distance between transmitter and receiver at the aligned antenna. The determined distance may be adjusted by the distance between the aligned antenna and a reference point relative to the antenna array (e.g., a center position of the antenna array) to determine range between the mobile device 102 and the transmitter 110.

At block 512, if multiple iterations are used to refine the expected relative reception time, as discussed in block 506, a decision is made if additional iterations are to be performed. For example, two or three iterations may be performed. If iterations are not complete, the procedure may flow back to block 506 and the determined range may be used to determine the expected relative reception time in block 506 in another iteration. If iterations are complete, the procedure may flow to block 514.

At block 514, the position of the mobile device 102 may be determined using the determined range between the mobile device 102 and the transmitter 110 from block 510 along with determined ranges to other transmitters (e.g., transmitters 110A and 110B in FIGS. 1A and B), and known locations of the transmitters, e.g., using trilateration. In some implementations, the decision at block 512 may be performed after the position is determined at block 514.

In some implementations, with motion of the mobile device 102, ultimately a multipath free signal may be observed from at least one antenna in the antenna array. The IMU sensor 213 or camera 218 integration may be used to assist in maintaining a reduced multipath state even with subsequent multipath only conditions, along with code-carrier filtering.

Figure 6:
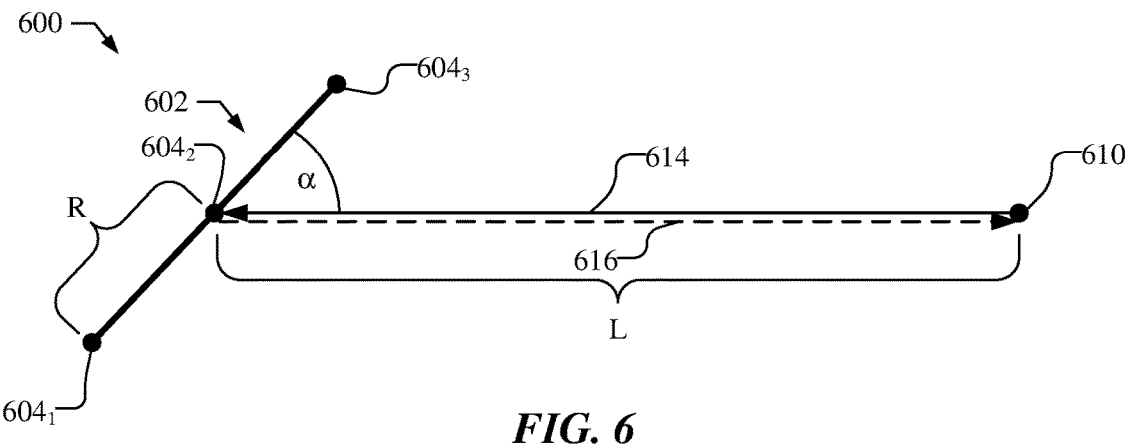
FIG. 6 illustrates signal transmission between a transmitter and a receiver using a spatially diverse antenna array.

FIG. 6 illustrates, by way of example, signal transmission 600 between a transmitter and a receiver using a spatially diverse antenna array 602. For example, the antenna array 602 may be on a receiver (the mobile device 102) and receive a signal 614 transmitted by an antenna 610 on the transmitter (the transmitter 110). Conversely, the antenna array 602 may be on the transmitter (the transmitter 110) and transmits signals 616 that are received by an antenna 610 on the receiver (the mobile device 102). During transmission by the antenna array 602, each antenna transmits a signal with a different signal characteristic, e.g., a unique positioning signal on the same carrier frequency, that can be distinguished by the receiver. For clarity and ease or reference, the reception of signal 614 by the antenna array 602 will be discussed herein. The reception or transmission of signals by the antenna array 602 is symmetrical and, thus, the use of transmitting spatially diverse antenna array 602 to minimize multipath errors will be understood in view of the discussion of the receiving spatially diverse antenna array.

FIG. 6 is similar to FIG. 4, but illustrates the use of three individual antennas $604_1$, $604_2$, $604_3$ in the antenna array 602, sometimes collectively referred to as antennas 604. The antennas 604 have a known geometric relationship. The antenna array 602 may be part of the mobile device 602 and the transmitter antenna may be part of the transmitter 110 shown in FIG. 1A. Antennas $604_1$ and $604_3$ are a known distance R from the center antenna $604_2$ on the linear antenna array 602. Other geometric relationships and arrangements of antennas may be used if desired. As illustrated, the antenna $604_2$, which is the center of the linear antenna array 602, and may server as the reference point on the antenna array 602, is a distance L from the transmitter antenna 610, which is an unknown quantity. The linear antenna array 602 may be oriented at an angle α with respect to the transmitter antenna 610 and the transmitter antenna 610 may have an elevation angle β, both of which may be known based on sensor measurements in the mobile device 102, such as a magnetometer or camera, and/or previously determined positions and orientations with respect to the transmitter antenna 610. While linear relationship is illustrated in the antenna array 602, it should be understood that non-linear and even non-planar arrangement of antennas may be used if desired.

The TOA of the signal received at each antenna 604 may be measured using any desired technique to produce the best measurement result for each antenna, which may be based on the type and characteristic of the transmitted signal, as well known in the art. It will be understood that if a transmitting antenna array is used, the receiving antenna measures the TOA of signal transmitted from each antenna in the transmitting antenna array, which may be identified based on the different signal characteristics. The measured TOA for each antenna 604 may be based on the best measurement result, and thus, the TOA measured at some antennas may be based on multipath signals. In other words, not all of the antennas 604 will measure a TOA based on a LOS signal from the transmitter antenna 610. The signal reception times at each antenna are measured with respect to a local receiver clock, so the absolute time of arrival is not known. However, the relative reception time between the antennas may be accurately obtained from the measurement, as they all use the same local receiver clock. Accordingly, based on the measured TOA at each antenna 604, a measured relative reception time of the signal transmitted by the transmitter antenna 610 may be determined for each antenna 604 in the antenna array 602. For example, the TOA at each antenna may be compared to a reference antenna, e.g., antenna $604_2$ to determine the measured relative reception time of the signals at each antenna. Thus, the TOA at antenna's $604_1$ and $604_3$ may be compared to the TOA at antenna $604_2$ to determine the measured relative reception times.

Figure 7:
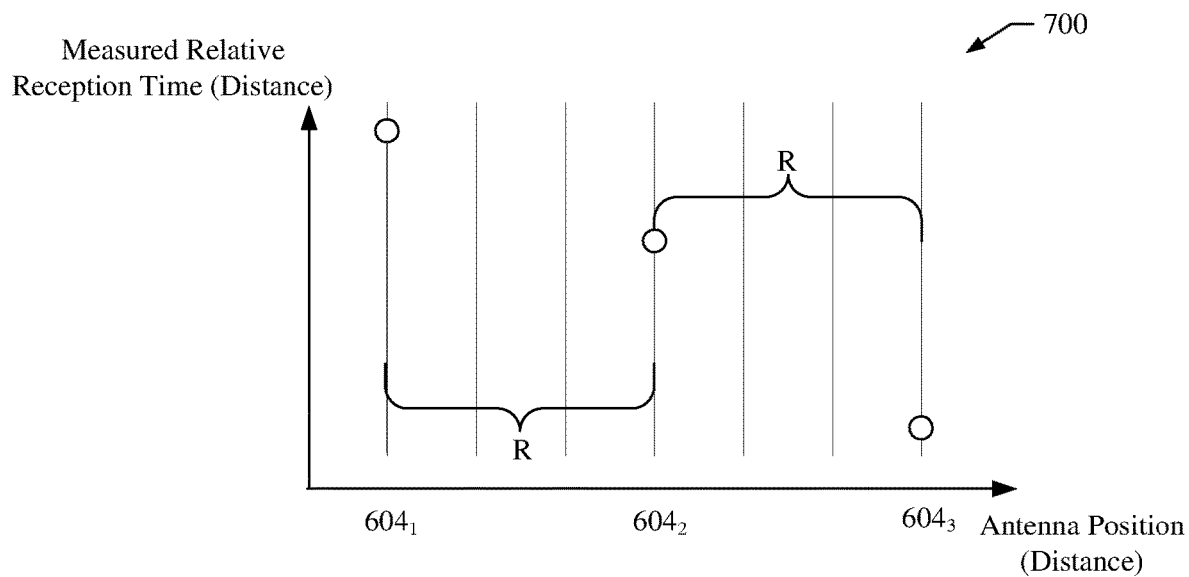
FIG. 7 shows a graph that visually illustrates with white circles the measured relative reception time of each antenna in the antenna array for the signals received from the transmitting antenna shown in FIG. 6.

FIG. 7, by way of example, shows a graph 700 that visually illustrates with white circles the measured relative reception time (distance) of each antenna 604 in the antenna array 602 for the signals received from the transmitting antenna 610 shown in FIG. 6. The measured relative reception time for some of the antennas 604 may be based on the TOA produced by a LOS signal from the transmitting antenna 610, while the measured relative reception time for other the antennas 604 may be based on the TOA produced by multipath signals from the transmitting antenna 610. In some circumstances, the measured relative reception time for all of the antennas 604 may be based on the TOA produced by multipath signals from the transmitting antenna 610, but some of the multipath signals may be shorter than other multipath signals, and thus, closer LOS and more accurate.

The expected relative reception time of each antenna 604 in the antenna array 602 may be determined based on the relative locations, e.g., R, of the antennas 604 in the antenna array 602 and an approximate orientation of the antenna array 602 to the transmitter antenna 610, e.g., $\alpha$ and $\beta$. For example, an expected distance may be estimated for each antenna 602 relative to the transmitting antenna 610. The expected distance may be estimated, e.g., using an estimated orientation and/or position for the antenna array 602, e.g., derived from an inertial measurement unit (IMU) sensor 213 or a camera 218 in the mobile device 102. In some implementations, the camera 218 may be used to determine a position or orientation using vision based navigation and markers (such as Quick Response (QR) codes). In some implementations, dead reckoning using IMU sensors 213 (shown in FIG. 2) and a previous position and orientation may be used to estimate the current expected distance between each antenna 604 and the transmitting antenna 610. Additionally or alternatively, the expected distances may be estimated based on previous determinations of the position, e.g., in multiple iterations of the procedure.

Figure 8:
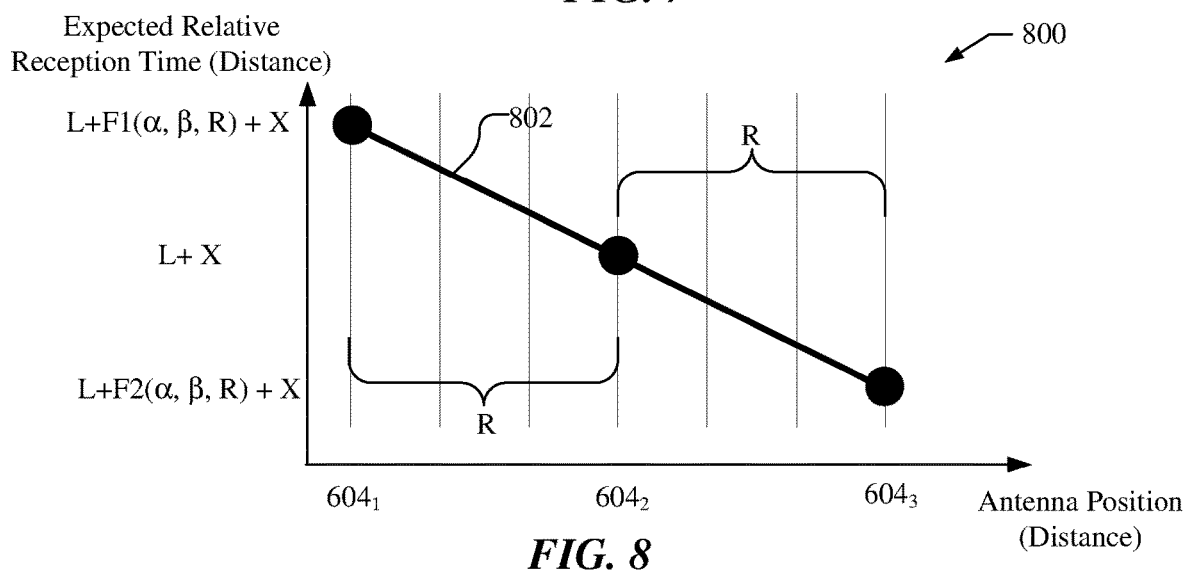
FIG. 8 shows a graph including a curve that visually illustrates with black circles the expected relative reception time of each antenna in the antenna array for line of sight signals received from the transmitting antenna show in FIG. 6.

FIG. 8, by way of example, shows a graph 800 including a curve 802 that visually illustrates with black circles the expected relative reception time (distance) of each antenna 604 in the antenna array 602 for line of sight signals received from the transmitting antenna 610 show in FIG. 6. The expected relative reception time for each antenna 604 is based on an LOS signal from the transmitting antenna 610, e.g., assuming there are no multipath delays. The expected relative reception time (distance) may be determined, e.g., based on the relative locations of the antennas 604 in the antenna array 602 and an approximate orientation of the antenna array 602 with respect to the transmitter antenna 610, e.g., $\alpha$, $\beta$, R, and L. The relative locations of the antennas 604, e.g., R, are known based on the known geometry of the antenna array 602, and the distance L and angles $\alpha$ and $\beta$ may be estimated from sensor, e.g., magnetometer, camera, compass, or dead reckoning measurements in the mobile device 102, and/or based on previously determined locations and orientations. In some implementations, multiple passes or iterations may be performed with a first iteration used to generate an approximate location and orientation of the mobile device 102, and a second iteration using the approximate location and orientation to refine the results. If desired more than two iterations may be used.

The expected relative reception time may be determined by estimating an expected distance to the wireless transmitter 610 for each antenna 604 in the antenna array 602, and determining a difference in the expected reception time at each antenna in the antenna array relative to a reference antenna. For example, as visually illustrated in FIG. 8, the distance from the antenna $604_2$ at the center of the antenna array 602 to the transmitting antenna 610 may be L+X, where L is the distance shown in FIG. 6, and X is an unknown offset as the mobile device 102 may not have an accurate stable clock synchronized to the transmitter 110. The reception time (distance) for antennas $604_1$ and $604_3$ in the antenna array 602 may be determined as a function of $\alpha$, $\beta$, R, and L. For example, the reception time (distance) for antennas $604_1$ and $604_N$ may be determined as L+F1($\alpha$, $\beta$, R)+X and L+F2($\alpha$, $\beta$, R)+X, respectively, e.g., where F1($\alpha$, $\beta$, R) and F2($\alpha$, $\beta$, R) may be determined using geometric functions. The expected distance at each antenna may be compared to a reference antenna, e.g., antenna $604_2$ to determine the expected relative reception time at each antenna 604 generating curve 800. In some implementation, the same reference antenna, e.g., antenna $604_2$ is used to determine the expected relative reception time and the measured relative reception time.

Once the measured relative reception times and the expected relative reception times for each antenna 604 in the antenna array 602 are obtained, the expected relative reception times may be fit to the measured relative reception times. For example, the fitting process may include aligning an expected relative reception time and a measured relative reception time for one antenna in the antenna array, with all other antennas in the antenna array having a measured relative reception time that is aligned with or that is greater than the expected relative reception time. For example, fitting the expected relative reception times to the measured relative reception times may be performed by minimizing a difference between the expected relative reception time and the measured relative reception times for a single antenna, wherein a difference between the expected relative reception time and the measured relative reception times for all other antennas in the antenna array 602 is a same or greater difference than for the antenna. An iterative or trial and error process may be used, where expected and measured relative reception time for a first antenna is aligned and it is determined if any other antennas have a measured relative reception time that is less than the expected relative reception time. If no other antennas have a measured relative reception time that is less than the expected relative reception time, then the first antenna is used. On the other hand, if other antennas do have a measured relative reception time that is less than the expected relative reception time, then a second antenna may be selected, e.g., based on the greatest difference between the measured relative reception time and the expected relative reception time. This process may continue until a best fit is found with all other antennas in the antenna array having a measured relative reception time that is aligned with or that is greater than the expected relative reception time. The antenna that has the aligned expected and measured relative reception times corresponds to the received signal that is either line of sight or the minimal multipath.

Figure 9A:
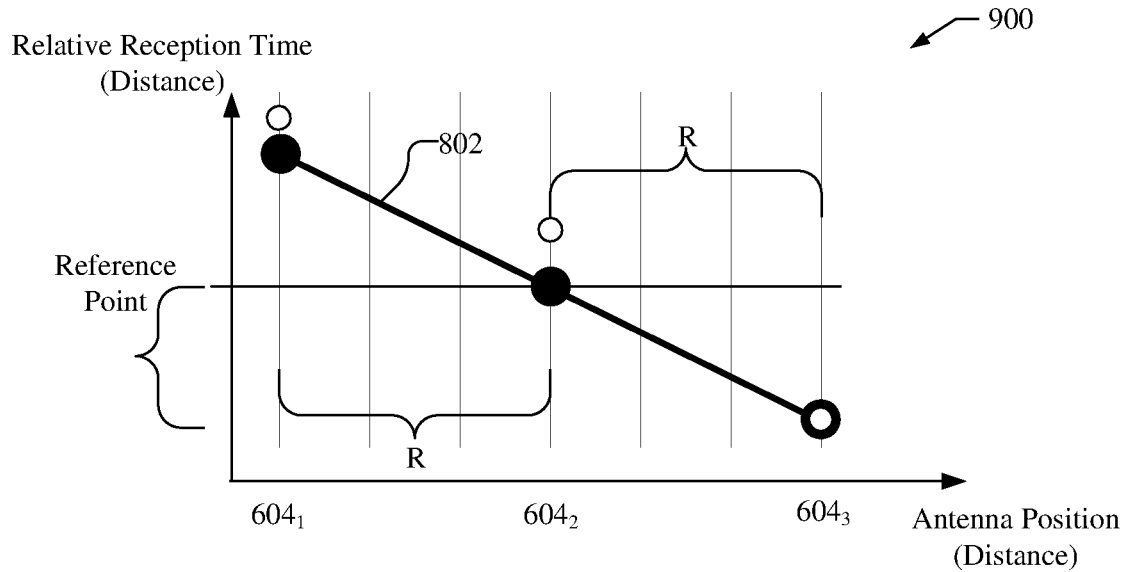
FIGS. 9A and 9B are graphs that visually illustrates alignment of the measured relative reception times with the expected relative reception times for antennas in the antenna array shown in FIG. 6.
Figure 9B:
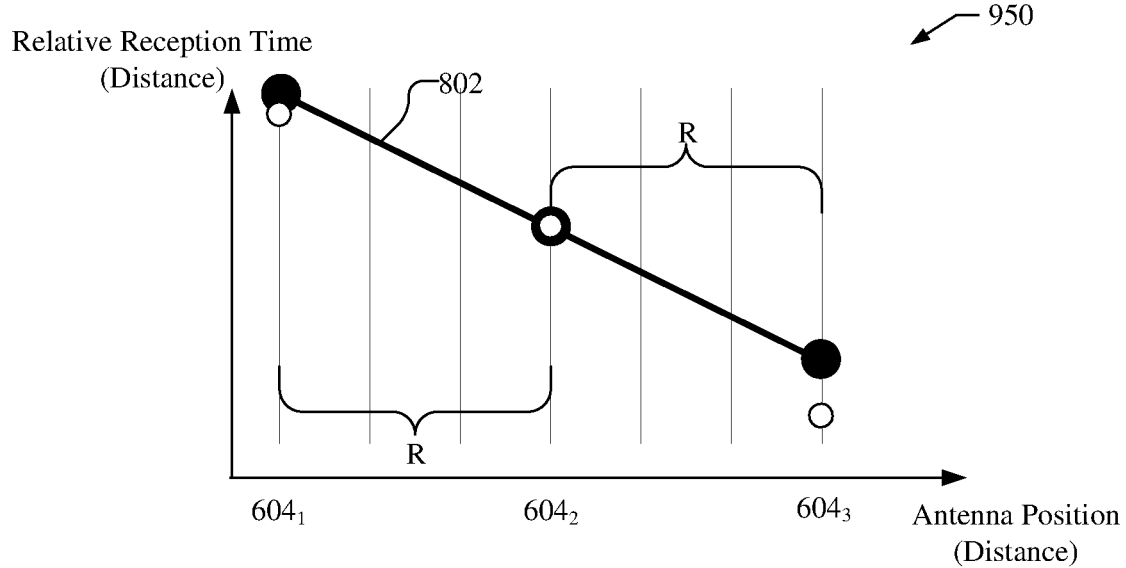

FIGS. 9A and 9B, by way of example, are graphs 900 and 950 that visually illustrates alignment of the measured relative reception times with white circles from FIG. 7 and the curve 802 with the expected relative reception times with black circles from FIG. 8. As illustrated in FIG. 9A, the expected and relative reception times are aligned for antenna $604_3$, and the measured relative reception time (shown with white circles) for antennas $604_1$ and $604_2$ are both greater than the expected relative reception times (shown with black circles).

For sake of comparison, as illustrated in FIG. 9B, if the curve 802 is slide upwards until the measured and expected relative reception times for antenna $604_2$ are aligned, it can be seen that the measured relative reception times (with white circles) are less than the expected relative receptions times (shown with black circles) for both antennas $604_1$ and $604_3$. Thus, unlike with the alignment illustrated in FIG. 9A, the alignment using antenna $604_2$ in FIG. 9B does not fit the requirement that measured relative reception time for the other antennas are the same or greater than the expected relative reception times.

Once a fit of the measured relative reception times and expected relative reception times is determined for an antenna, e.g., antenna $604_3$ as shown in FIG. 9A, with all other antennas having a measured relative reception time that is aligned with or greater than the expected relative reception time, an estimated best distance to the transmitting antenna 610 can be determined. For example, the antenna $604_3$ with the aligned expected and measured relative reception times corresponds to the antenna that receives either a line of sight signal or the minimal multipath signal. In other words, the measured TOA at antenna $604_3$ may be used as the best TOA measurement, which may be used to estimate a best distance between the antenna $604_3$ and the transmitting antenna 610, e.g., based on the TOD received from the transmitting antenna 610 and the measured TOA at antenna $604_3$ (TOD-TOA$_{604\_3}$), or using other ranging techniques.

As illustrated in FIG. 9A, however, antenna $604_3$ is not aligned with the reference point for the antenna array 602. Accordingly, to determine the best distance between the antenna array 602 and the transmitting antenna 610, the relative reception distance between the aligned antenna $604_3$ and the reference point may be added to or subtracted from the estimated best distance for the antenna $604_3$. The relative reception distance between the aligned antenna $604_3$ and the reference point is known or may be determined based on the geometry and orientation of the antenna array 602.

Accordingly, a ranging measurement may be performed using LOS signals or minimized multipath signals using the spatially diverse antenna array 602. Once an antenna in the antenna array 602 is determined to receive the best signal, e.g., based on fitting the expected relative reception times and the measurement relative reception times, estimated best distance to the transmitting device may be determined with respect to a reference point relative to the antenna array.

The use of the spatially diverse antenna array may provide additional information. For example, with additional antennas there is additional redundancy and cross checks. With the spatially diverse antenna array and procedure, the system works well even if all but one received antenna signal is corrupted by multipath. The spatially diverse antenna array provides a greater chance of obtaining a better ranging measurement.

With zero mean errors, the ensemble measurements are improved. For example, with multipath signals the errors are predominantly in one direction, longer than LOS. In some cases, there may be preprocessing such that the final measurements are not biased in one direction, but may be equally distributed above and below the real value. The mean of these values would be zero. With multiple antennas with zero mean errors (i.e., multipath errors are not biased in one direction), a best fit of the expected value with respect to the measured value may be performed to obtain the best TOA.

Additionally, a quality of result may be used to determine how good of a fit was done, e.g., with the expected relative reception time, e.g., using the final position estimate. For example, the expected relative reception times may be compared to the measured relative reception times to determine the quality of the overall measurements. If there is a good fit for all measured points relative to the expected points, it indicates that the signal reception is well behaved, indicating a good quality result.

Additionally, non-line of sight (NLOS) reception may be detected based on the fit between the expected and measured relative reception times. For example, the fit between the expected relative reception time 802 and the measured relative reception time may be used to detect non-line of sight (NLOS) reception or gross multipath. The slopes and/or amplitudes of both the expected relative reception time and the measured relative reception time may be determined. The slopes of the expected relative reception time and the measured relative reception time may be compared and if greater than a threshold, may indicate NLOS reception. Similarly, the amplitudes of the expected relative reception time and the measured relative reception time may be compared and if greater than a threshold, may indicate NLOS reception. For example, in a linear array, as illustrated in FIG. 6, if the slope of the measured relative reception time is significantly different from expected (e.g., greater than a threshold), then all signals for all antennas are arriving from a different angle, and accordingly, are likely NLOS. The amplitude for a linear array, i.e., the difference between the longest to the shortest reception time, may also provide information indicating NLOS. For instance, if the linear array is perpendicular to the LOS direction, then the reception time for all antennas should be about the same. If instead, there is a large difference in reception times, that could indicate that the linear array is not perpendicular to the LOS direction. Accordingly, a large difference in the amplitude of the measured relative reception times compared to the expected relative reception times, e.g., greater than a threshold, may be used to indicate NLOS because the signal is coming from a different direction. The slope and amplitude may be used together to determine NLOS.

While the present ranging procedure may rely on an estimated orientation and/or position of the mobile device 102 relative to the transmitter 110 to determine the expected relative reception times, e.g., as visually illustrated in FIG. 8, errors in the result that are due to an incorrect location estimate are small. For example, for a horizontal distance L of 10 m, a 5 m error in the estimated position has been found to produce less than 8 cm in error. With a horizontal distance L of 20 m, a 5 m error in the estimated position may be result in less than 1.4 cm error. Further, an error in the orientation, e.g., due to sensor errors, results in only small errors in the estimated orientation of the antenna array. For example, the resulting error in location at the endpoints of the linear array, e.g., antennas $604_1$ and $604_3$ in FIG. 6 for a small change in orientation θ, will be approximately 2*R*θ. A reasonable compass error, by way of example, may be between 1° and 5°, resulting in an error of less than 3.5 cm/meter/degree. For example, if the distance R in FIG. 6 is 0.5 m, the maximum position error produced due to a 3° compass error is 5.2 cm.

Accordingly, the expected relative location measurements to the wireless transmitter for each antenna in the antenna array, which is based on the estimated location and orientation of the antenna array with respect to the transmitting device is robust with respect to possible errors in location and orientation. Further, using multiple iterations and corrections of position, e.g., as illustrated in FIG. 5, may be used to refine the position and correct initial estimated location and orientation errors.

While FIGS. 4A and 6 illustrates the use of a linear spatially diverse antenna array with evenly distributed antennas, it should be understood that other arrangements of the antenna array may be used as well.

Figure 10:
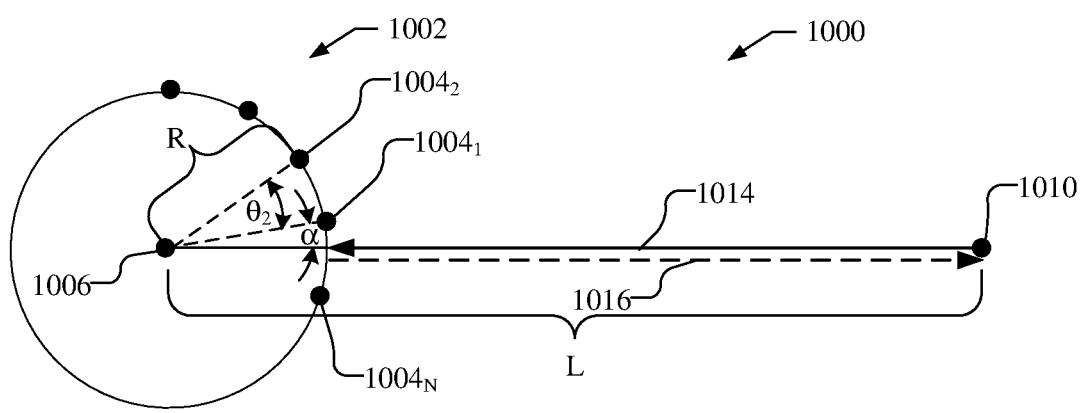
FIG. 10 illustrates signal transmissions between a transmitter and a receiver using a circular spatially diverse antenna array.

FIG. 10 illustrates, by way of example, signal transmission 1000 between a transmitter and a receiver using a circular spatially diverse antenna array 1002. Similar to the discuss in FIG. 6, the antenna array 1002 may be on a receiver (the mobile device 102) and receive a signal 1014 transmitted by an antenna 1010 on the transmitter (the transmitter 110) or, conversely, the antenna array 1002 may be on the transmitter (the transmitter 110) and transmit signals 1016 that are received by an antenna 1010 on the receiver (the mobile device 102). For clarity and ease or reference, the reception of signal 1014 by the antenna array 1002 will be discussed.

The circular antenna array 1002 may include a number of antennas $1004_1, 1004_2, \ldots 1004_N$ in the antenna array 1002, sometimes collectively referred to as antennas 1004. The antennas 1004 have a known geometric relationship, but need not be symmetrically arranged. For example, the circular antenna array 1002 may have a radius R, and each antenna 1004 may have a known position on the circle, e.g., identified by an angle $\theta_i$, where i represents the antenna $1004_i$ with respect to the first antenna $1004_1$ or another reference antenna. The reference point 1006 may be at the center of the antenna array 1002, but may be located in other positions with known positions relative to each of the antennas 1004. The transmitter antenna 1010 may have an elevation angle $\beta$, with respect to the antenna array 1002. The reference point 1006 is a distance L from the transmitter antenna 1010. The circular antenna array 1002 is rotated by an angle $\alpha$ between the radius 1005 and the LOS to the transmitter antenna 1010.

Figure 11:
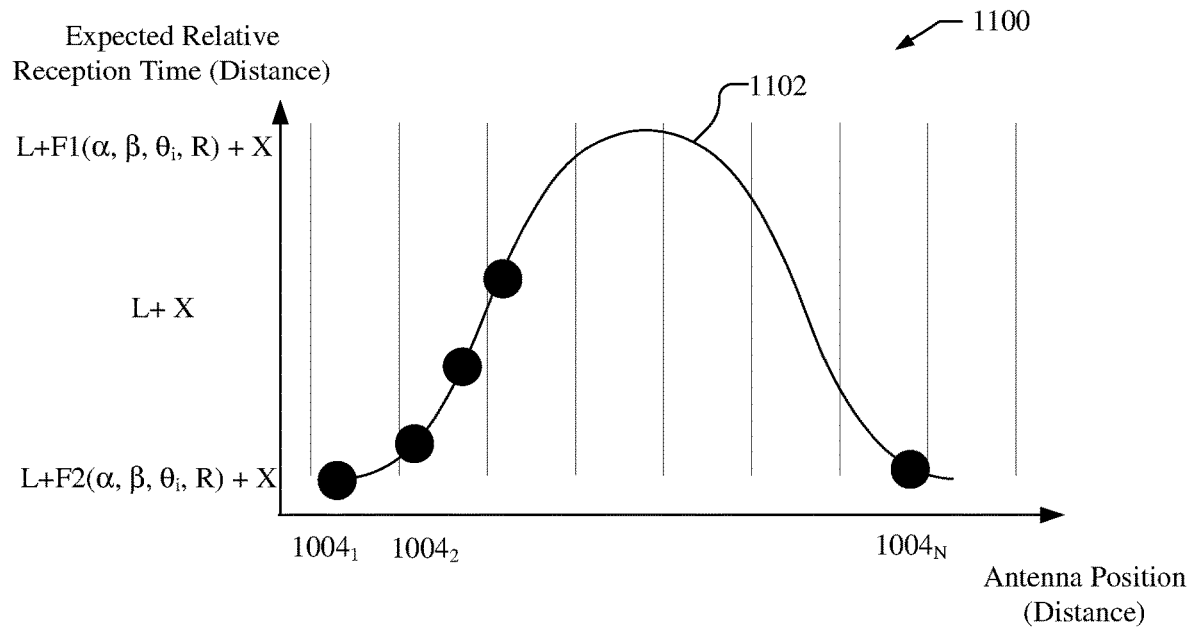
FIG. 11 shows a graph including a curve that visually illustrates with black circles the expected relative reception time of each antenna in the antenna array shown in FIG. 10.

FIG. 11, by way of example, shows a graph 1100 including a curve 1102 that visually illustrates with black circles the expected relative reception time (distance) of each antenna 1004 in the antenna array 1002 for the signals received from the transmitting antenna 1010 shown in FIG. 10. The expected relative reception time for each antenna 1004 is based on an LOS signal from the transmitting antenna 1010, e.g., assuming there are no multipath delays. The expected relative reception time (distance) may be determined, e.g., based on the relative locations of the antennas 1004 in the circular antenna array 1006 and an approximate location of the antenna array 1002 with respect to the transmitter antenna 1010, e.g., $\alpha$, $\beta$, $\theta_i$, R, and L.

Figure 12:
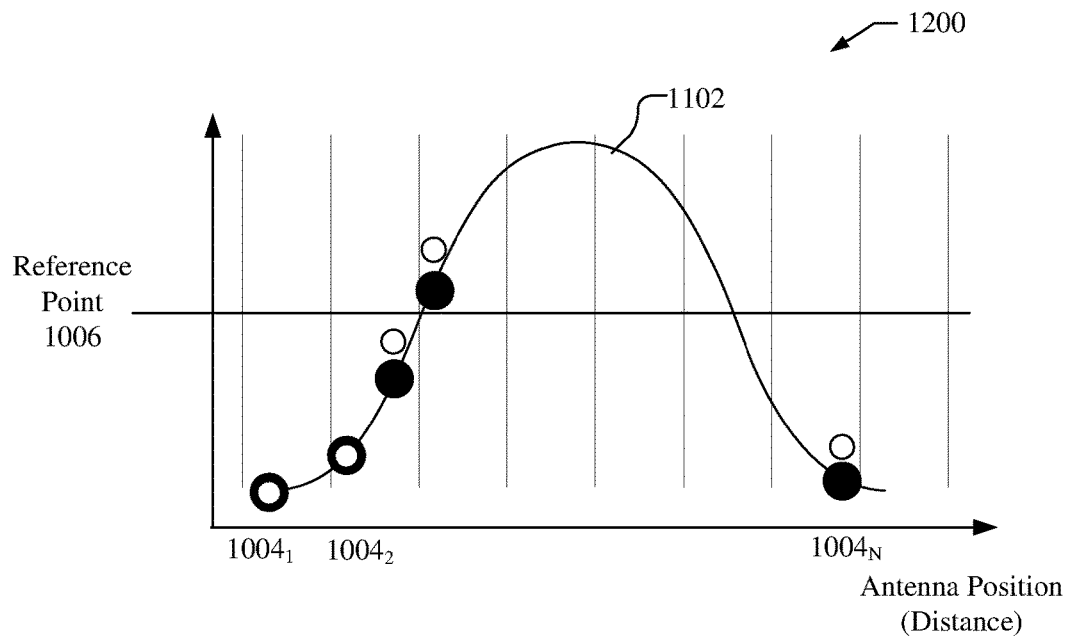
FIG. 12 shows a graph that visually illustrates alignment of measured relative reception times and the expected relative reception times for antennas in the antenna array shown in FIG. 10.

FIG. 12, by way of example, shows a graph 1200 that visually illustrates alignment of measured relative reception times for signals measured by the antennas 1004 in FIG. 10 (shown with white circles) and the curve 1102 with the expected relative reception times with black circles from FIG. 11. As illustrated in FIG. 12, the expected and relative reception times are aligned for antenna $1004_1$, and the measured relative reception time (shown with white circles) for all other antennas 1004 are either greater or the same (e.g. for $1004_2$) than the expected relative reception times (shown with black circles).

Once a fit of the measured relative reception times and expected relative reception times is determined for an antenna, e.g., antenna $1004_1$ as shown in FIG. 12, with all other antennas having a measured relative reception time that is aligned with or greater than the expected relative reception time, an estimated best distance to the transmitting antenna 1010 can be determined, e.g., based on the fitting of the measured and expected relative reception times and the relative position of the aligned antenna $1004_1$ to the reference point 1006 for the antenna array 1002.

Figure 13:
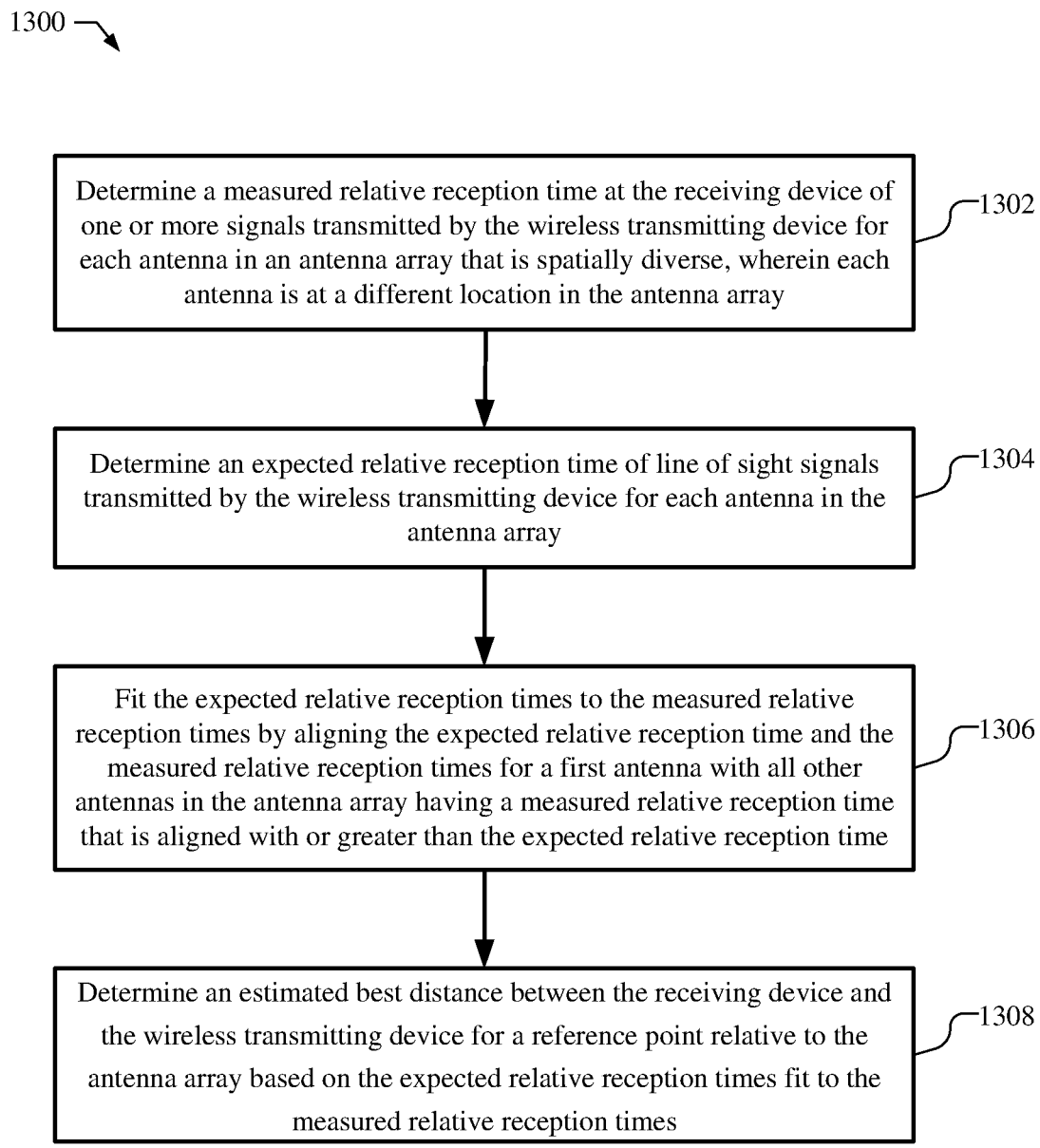
FIG. 13 shows a flowchart for an exemplary method for determining a range between a wireless transmitting device and a receiving device using spatially diverse antenna array.

FIG. 13 shows a flowchart for an exemplary method 1300 for determining a range between a wireless transmitting device, such as transmitter 110 shown in FIGS. 1A and 1B, and a receiving device, such as mobile device 102 shown in FIGS. 1A and 1B, in a manner consistent with disclosed implementations.

At block 1302, a measured relative reception time at the receiving device of one or more signals transmitted by the wireless transmitting device is determined for each antenna in an antenna array that is spatially diverse, wherein each antenna is at a different location in the antenna array, e.g., as discussed at blocks 502 and 504 of FIG. 5, and FIG. 7. For example, in one implementation, the antenna array is on the receiving device and antennas in the antenna array receive signals transmitted by the wireless transmitting device. In another implementation, the antenna array is on the wireless transmitting device and each antenna in the antenna array transmits a separate signal having a different signal characteristic. A means for determining a measured relative reception time at the receiving device of one or more signals transmitted by the wireless transmitting device for each antenna in an antenna array that is spatially diverse, wherein each antenna is at a different location in the antenna array may include, e.g., the transceiver 215 and one or more processors 210 with dedicated hardware or implementing executable code or software instructions in memory 211 and/or medium 212 in the mobile device 200, such as the measured relative reception time module 262, shown in FIG. 2. In one implementation, for example, the measured relative reception time for each antenna in the antenna array may be determined by determining a difference in a time of arrival associated with each antenna in the antenna array relative to a time of arrival associated with a reference antenna. A means for determining a difference in a time of arrival associated with each antenna in the antenna array relative to a time of arrival associated with a reference antenna may include, e.g., the transceiver 215 and one or more processors 210 with dedicated hardware or implementing executable code or software instructions in memory 211 and/or medium 212 in the mobile device 200, such as the measured relative reception time module 262, shown in FIG. 2.

At block 1304, an expected relative reception time of line of sight signals transmitted by the wireless transmitting device may be determined for each antenna in the antenna array, e.g., as discussed at block 506 of FIG. 5 and FIG. 8. A means for determining an expected relative reception time of line of sight signals transmitted by the wireless transmitting device for each antenna in the antenna array may include, e.g., the transceiver 215, sensors 213, camera 218, and one or more processors 210 with dedicated hardware or implementing executable code or software instructions in memory 211 and/or medium 212 in the mobile device 200, such as the expected relative reception time module 264, shown in FIG. 2. For example, in one implementation, the expected relative reception time for each antenna in the antenna array may be determined by estimating an expected distance between the wireless transmitting device and the receiving device for each antenna in the antenna array; and determining the expected relative reception time for each antenna in the antenna array based on a difference in the expected distance for each antenna relative to a reference antenna, e.g., as discussed at block 506 of FIG. 5 and FIG. 8. For example, estimating the expected distance for each antenna comprises estimating an orientation of the antenna array may use one or more inertial measurement unit (IMU) sensors or a camera on the receiving device. In another example, estimating the expected distance for each antenna may use one or more previously estimated best distances to the wireless transmitting device determined at previous time instances. For example, estimating the expected distance for each antenna may further use motion data acquired between the previous time instances from one or more inertial measurement unit (IMU) sensors or a camera on the receiving device. A means for estimating an expected distance between the wireless transmitting device and the receiving device for each antenna in the antenna array may include, e.g., the transceiver 215, sensors 213, camera 218, and one or more processors 210 with dedicated hardware or implementing executable code or software instructions in memory 211 and/or medium 212 in the mobile device 200, such as the expected relative reception time module 264, shown in FIG. 2. Further, a means for determining the expected relative reception time for each antenna in the antenna array based on a difference in the expected distance for each antenna relative to a reference antenna may include, e.g., the transceiver 215, sensors 213, camera 218, and one or more processors 210 with dedicated hardware or implementing executable code or software instructions in memory 211 and/or medium 212 in the mobile device 200, such as the expected relative reception time module 264, shown in FIG. 2.

At block 1306, the expected relative reception times may be fit to the measured relative reception times by aligning the expected relative reception time and the measured relative reception times for a first antenna with all other antennas in the antenna array having a measured relative reception time that is aligned with or greater than the expected relative reception time, e.g., as discussed at block 508 of FIG. 5 and FIG. 9A. The other antennas in the antenna array having the measured relative reception time that is greater than the expected relative reception time may be associated with one or more multi-path channels. A means for fitting the expected relative reception times to the measured relative reception times by aligning the expected relative reception time and the measured relative reception times for a first antenna with all other antennas in the antenna array having a measured relative reception time that is aligned with or greater than the expected relative reception time may include, e.g., the transceiver 215 and one or more processors 210 with dedicated hardware or implementing executable code or software instructions in memory 211 and/or medium 212 in the mobile device 200, such as the fitting module 266, shown in FIG. 2. In one implementation, the expected relative reception times may be fit to the measured relative reception times by aligning the expected relative reception time and the measured relative reception times for the first antenna may include minimizing a difference between the expected relative reception time and the measured relative reception times for the first antenna, wherein a difference between the expected relative reception time and the measured relative reception times for the all other antennas in the antenna array is a same or greater difference than for the first antenna, e.g., as discussed at block 508 of FIG. 5 and FIGS. 9A and 9B. A means for minimizing a difference between the expected relative reception time and the measured relative reception times for the first antenna, wherein a difference between the expected relative reception time and the measured relative reception times for the all other antennas in the antenna array is a same or greater difference than for the first antenna may include, e.g., the transceiver 215 and one or more processors 210 with dedicated hardware or implementing executable code or software instructions in memory 211 and/or medium 212 in the mobile device 200, such as the fitting module 266, shown in FIG. 2.

At block 1308, an estimated best distance between the receiving device and the wireless transmitting device may be determined for a reference point relative to the antenna array based on the expected relative reception times fit to the measured relative reception times, e.g., as discussed at block 510 of FIG. 5 and FIG. 9A. For example, the estimated best distance may be determined using a time of arrival of the signal associated with the first antenna and using a time of departure of the signal associated with the first antenna as received from the wireless transmitting device, e.g., as discussed at block 510 of FIG. 5 and FIG. 9A. A means for determining an estimated best distance between the receiving device and the wireless transmitting device for a reference point relative to the antenna array based on the expected relative reception times fit to the measured relative reception times may include, e.g., the transceiver 215 and one or more processors 210 with dedicated hardware or implementing executable code or software instructions in memory 211 and/or medium 212 in the mobile device 200, such as the ranging module 268, shown in FIG. 2.

In one implementation, non-line of sight reception of the one or more signals may be detected based on the fit of the expected relative reception times to the measured relative reception times, e.g., as discussed at block 508 of FIG. 5 and FIGS. 9A and 9B. For example, the non-line of sight reception of the one or more signals may be detected by detecting at least one of a difference in an amplitude of the expected relative reception times with respect to an amplitude of the measured relative reception times that is greater than a first threshold or a difference in a slope of the expected relative reception times with respect to a slope of the measured relative reception times that is greater than a second threshold, e.g., as discussed at block 508 of FIG. 5 and FIGS. 9A and 9B. A means for detecting non-line of sight reception of the one or more signals based on the fit of the expected relative reception times to the measured relative reception times, and a means for detecting at least one of a difference in an amplitude of the expected relative reception times with respect to an amplitude of the measured relative reception times that is greater than a first threshold or a difference in a slope of the expected relative reception times with respect to a slope of the measured relative reception times that is greater than a second threshold may include, e.g., the transceiver 215 and one or more processors 210 with dedicated hardware or implementing executable code or software instructions in memory 211 and/or medium 212 in the mobile device 200, such as the fitting module 266, shown in FIG. 2.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of determining a range between a wireless transmitting device and a receiving device, the method comprising:
   determining a measured relative reception time at the receiving device of one or more signals transmitted by the wireless transmitting device for each antenna in an antenna array that is spatially diverse, wherein each antenna is at a different location in the antenna array;
   determining an expected relative reception time of line of sight signals transmitted by the wireless transmitting device for each antenna in the antenna array;
   fitting expected relative reception times to measured relative reception times by aligning the expected relative reception time for a first antenna and the measured relative reception time for the first antenna with each other antenna in the antenna array having an associated measured relative reception time that is aligned with or greater than an associated expected relative reception time; and
   determining an estimated best distance between the receiving device and the wireless transmitting device for a reference point relative to the antenna array based on the expected relative reception times fit to the measured relative reception times.

2. The method of claim 1, wherein determining the measured relative reception time at the receiving device of one or more signals transmitted by the wireless transmitting device for each antenna in the antenna array comprises determining a difference in a time of arrival associated with each antenna in the antenna array relative to a time of arrival associated with a reference antenna.

3. The method of claim 1, wherein determining the expected relative reception time of the line of sight signals transmitted by the wireless transmitting device for each antenna in the antenna array comprises:
   estimating an expected distance between the wireless transmitting device and the receiving device for each antenna in the antenna array; and
   determining the expected relative reception time for each antenna in the antenna array based on a difference in the expected distance for each antenna relative to a reference antenna.

4. The method of claim 3, wherein estimating the expected distance for each antenna comprises estimating an orientation of the antenna array using one or more inertial measurement unit (IMU) sensors or a camera on the receiving device.

5. The method of claim 3, wherein estimating the expected distance for each antenna uses one or more previously estimated best distances to the wireless transmitting device determined at previous time instances.

6. The method of claim 5, wherein estimating the expected distance for each antenna further uses motion data acquired between the previous time instances from one or more inertial measurement unit (IMU) sensors or a camera on the receiving device.

7. The method of claim 1, wherein fitting the expected relative reception times to the measured relative reception times by aligning the expected relative reception time for the first antenna and the measured relative reception time for the first antenna comprises minimizing a difference between the expected relative reception time for the first antenna and the measured relative reception times for the first antenna, wherein a difference between the associated expected relative reception time and the associated measured relative reception time for each other antenna in the antenna array is a same or greater difference than for the first antenna.

8. The method of claim 1, wherein each other antenna in the antenna array having the associated measured relative reception time that is greater than the associated expected relative reception time is associated with one or more multi-path channels.

9. The method of claim 1, wherein determining the estimated best distance comprises using a time of arrival of a signal associated with the first antenna and using a time of departure of the signal associated with the first antenna as received from the wireless transmitting device.

10. The method of claim 1, further comprising detecting non-line of sight reception of the one or more signals based on a fit of the expected relative reception times to the measured relative reception times.

11. The method of claim 10, wherein detecting the non-line of sight reception of the one or more signals based on the fit of the expected relative reception times to the measured relative reception times comprises detecting at least one of a difference in an amplitude of the expected relative reception times with respect to an amplitude of the measured relative reception times that is greater than a first threshold or a difference in a slope of the expected relative reception times with respect to a slope of the measured relative reception times that is greater than a second threshold.

12. The method of claim 1, wherein the antenna array is on the receiving device and antennas in the antenna array receive signals transmitted by the wireless transmitting device.

13. The method of claim 1, wherein the antenna array is on the wireless transmitting device and each antenna in the antenna array transmits a separate signal having a different signal characteristic.

14. A receiving device configured to determine a range between a wireless transmitting device and the receiving device, comprising:
a wireless receiver configured to wirelessly receive signals from the wireless transmitting device;
at least one memory; and
at least one processor coupled to the wireless receiver and the at least one memory and configured to:
determine a measured relative reception time at the receiving device of one or more signals transmitted by the wireless transmitting device for each antenna in an antenna array that is spatially diverse, wherein each antenna is at a different location in the antenna array;
determine an expected relative reception time of line of sight signals transmitted by the wireless transmitting device for each antenna in the antenna array;
fit expected relative reception times to measured relative reception times by aligning the expected relative reception time for a first antenna and the measured relative reception time for the first antenna with each other antenna in the antenna array having an associated measured relative reception time that is aligned with or greater than an associated expected relative reception time; and
determine an estimated best distance between the receiving device and the wireless transmitting device for a reference point relative to the antenna array based on the expected relative reception times fit to the measured relative reception times.

15. The receiving device of claim 14, wherein the at least one processor is configured to determine the measured relative reception time at the receiving device of one or more signals transmitted by the wireless transmitting device for each antenna in the antenna array by being configured to determine a difference in a time of arrival associated with each antenna in the antenna array relative to a time of arrival associated with a reference antenna.

16. The receiving device of claim 14, wherein the at least one processor is configured to determine the expected relative reception time of the line of sight signals transmitted by the wireless transmitting device for each antenna in the antenna array by being configured to:
estimate an expected distance between the wireless transmitting device and the receiving device for each antenna in the antenna array; and
determine the expected relative reception time for each antenna in the antenna array based on a difference in the expected distance for each antenna relative to a reference antenna.

17. The receiving device of claim 16, wherein the at least one processor is configured to estimate the expected distance for each antenna by being configured to estimate an orientation of the antenna array using one or more inertial measurement unit (IMU) sensors or a camera on the receiving device.

18. The receiving device of claim 16, wherein the at least one processor is configured to estimate the expected distance for each antenna uses one or more previously estimated best distances to the wireless transmitting device determined at previous time instances.

19. The receiving device of claim 18, wherein the at least one processor is configured to estimate the expected distance for each antenna further uses motion data acquired between the previous time instances from one or more inertial measurement unit (IMU) sensors or a camera on the receiving device.

20. The receiving device of claim 14, wherein the at least one processor is configured to fit the expected relative reception times to the measured relative reception times by aligning the expected relative reception time for the first antenna and the measured relative reception time for the first antenna is configured to minimize a difference between the expected relative reception time for the first antenna and the measured relative reception times for the first antenna, wherein a difference between the associated expected relative reception time and the associated measured relative reception time for each other antenna in the antenna array is a same or greater difference than for the first antenna.

21. The receiving device of claim 14, wherein each other antenna in the antenna array having the associated measured relative reception time that is greater than the associated expected relative reception time is associated with one or more multi-path channels.

22. The receiving device of claim 14, wherein the at least one processor is configured to determine the estimated best distance by being configured to use a time of arrival of a signal associated with the first antenna and using a time of departure of the signal associated with the first antenna as received from the wireless transmitting device.

23. The receiving device of claim 14, wherein the at least one processor is further configured to detect non-line of sight reception of the one or more signals based on a fit of the expected relative reception times to the measured relative reception times.

24. The receiving device of claim 23, wherein the at least one processor is configured to detect the non-line of sight reception of the one or more signals based on the fit of the expected relative reception times to the measured relative reception times by being configured to detect at least one of a difference in an amplitude of the expected relative reception times with respect to an amplitude of the measured relative reception times that is greater than a first threshold or a difference in a slope of the expected relative reception times with respect to a slope of the measured relative reception times that is greater than a second threshold.

25. The receiving device of claim 14, wherein the antenna array is on the receiving device and antennas in the antenna array receive signals transmitted by the wireless transmitting device.

26. The receiving device of claim 14, wherein the antenna array is on the wireless transmitting device and each antenna in the antenna array transmits a separate signal having a different signal characteristic.

27. A receiving device configured to determine a range between a wireless transmitting device and the receiving device, comprising:
  means for determining a measured relative reception time at the receiving device of one or more signals transmitted by the wireless transmitting device for each antenna in an antenna array that is spatially diverse, wherein each antenna is at a different location in the antenna array;
  means for determining an expected relative reception time of line of sight signals transmitted by the wireless transmitting device for each antenna in the antenna array;
  means for fitting expected relative reception times to measured relative reception times by aligning the expected relative reception time for a first antenna and the measured relative reception time for the first antenna with each other antenna in the antenna array having an associated measured relative reception time that is aligned with or greater than an associated expected relative reception time; and
  means for determining an estimated best distance between the receiving device and the wireless transmitting device for a reference point relative to the antenna array based on the expected relative reception times fit to the measured relative reception times.

28. A non-transitory computer readable storage medium including program code stored thereon, the program code is operable to configure at least one processor in a receiving device to determine a range between a wireless transmitting device and the receiving device, comprising:
  program code to determine a measured relative reception time at the receiving device of one or more signals transmitted by the wireless transmitting device for each antenna in an antenna array that is spatially diverse, wherein each antenna is at a different location in the antenna array;
  program code to determine an expected relative reception time of line of sight signals transmitted by the wireless transmitting device for each antenna in the antenna array;
  program code to fit expected relative reception times to measured relative reception times by aligning the expected relative reception time for a first antenna and the measured relative reception time for the first antenna with each other antenna in the antenna array having an associated measured relative reception time that is aligned with or greater than an associated expected relative reception time; and
  program code to determine an estimated best distance between the receiving device and the wireless transmitting device for a reference point relative to the antenna array based on the expected relative reception times fit to the measured relative reception times.

* * * * *